(12) United States Patent
Yan et al.

(10) Patent No.: US 11,003,643 B2
(45) Date of Patent: May 11, 2021

(54) MULTI-LEVEL CONFLICT-FREE ENTITY CLUSTERINGS

(71) Applicant: Amperity, Inc., Seattle, WA (US)

(72) Inventors: Yan Yan, Seattle, WA (US); Stephen Keith Meyles, Seattle, WA (US); Graeme Andrew Kyle Roche, Seattle, WA (US); Jeffrey Allen Stokes, Seattle, WA (US); Carlos Minoru Sakoda, Seattle, WA (US); Dan Suciu, Seattle, WA (US)

(73) Assignee: AMPERITY, INC., Seattle, WA (US)

( * ) Notice: Subject to any disclaimer, the term of this patent is extended or adjusted under 35 U.S.C. 154(b) by 0 days.

(21) Appl. No.: 16/399,162

(22) Filed: Apr. 30, 2019

(65) Prior Publication Data

US 2020/0349136 A1    Nov. 5, 2020

(51) Int. Cl.

| | | |
|---|---|---|
| *G06F 16/22* | (2019.01) | |
| *G06F 16/28* | (2019.01) | |
| *G06N 20/00* | (2019.01) | |
| *G06K 9/62* | (2006.01) | |
| *G06F 40/18* | (2020.01) | |
| *G06F 40/177* | (2020.01) | |
| *G06N 7/00* | (2006.01) | |

(52) U.S. Cl.
CPC .......... *G06F 16/221* (2019.01); *G06F 16/282* (2019.01); *G06F 16/285* (2019.01); *G06F 40/177* (2020.01); *G06F 40/18* (2020.01); *G06K 9/6218* (2013.01); *G06N 7/005* (2013.01); *G06N 20/00* (2019.01)

(58) Field of Classification Search
CPC ...... G06F 16/285; G06F 16/35; G06F 16/221; G06F 16/282; G06F 17/245; G06F 17/246; G06F 40/18; G06F 40/177; G06N 7/005; G06N 20/00; G06K 9/6218
USPC .................................. 707/E17.046, 999.006
See application file for complete search history.

(56) References Cited

U.S. PATENT DOCUMENTS

| | | | | |
|---|---|---|---|---|
| 8,595,038 | B2* | 11/2013 | Lynn ...................... | G06Q 10/00 |
| | | | | 705/4 |
| 9,946,958 | B1* | 4/2018 | Gorelick ............... | G06K 9/6219 |
| 9,953,372 | B1* | 4/2018 | Dziabiak ................ | G06Q 30/02 |
| 10,298,910 | B1* | 5/2019 | Kroeger ................ | H04N 13/246 |
| 2004/0117449 | A1* | 6/2004 | Newman ............... | G06F 16/284 |
| | | | | 709/206 |
| 2004/0172393 | A1* | 9/2004 | Kazi ...................... | G06F 16/313 |
| 2005/0182764 | A1* | 8/2005 | Evans ................... | G06K 9/6218 |
| 2006/0242147 | A1* | 10/2006 | Gehrking .............. | G06F 16/285 |
| 2009/0198686 | A1* | 8/2009 | Cushman, II ......... | G06F 16/215 |
| 2009/0271363 | A1* | 10/2009 | Bayliss ................. | G06F 16/285 |
| 2012/0023107 | A1* | 1/2012 | Nachnani .......... | G06F 16/24532 |
| | | | | 707/748 |

(Continued)

*Primary Examiner* — Dennis Truong
(74) *Attorney, Agent, or Firm* — George David Zalepa; Greenberg Traurig LLP

(57) ABSTRACT

The present disclosure relates clustering similar data records together in a hierarchical clustering scheme. Each tier in a cluster corresponds to a minimal match score, which reflects a degree of confidence. In this respect, a higher confidence may lead to smaller sized clusters while a lower confidence may lead to larger sized clusters. Ordinal classification may be used to generate hierarchical clusters. In some embodiments, hierarchical clustering with conflict resolution is used to resolve user-defined hard conflicts in each tier of the clustering results.

20 Claims, 16 Drawing Sheets

(56) References Cited

U.S. PATENT DOCUMENTS

| | | | | |
|---|---|---|---|---|
| 2012/0226692 A1* | 9/2012 | Kazi | ............... | G06F 16/313 |
| | | | | 707/737 |
| 2013/0124474 A1* | 5/2013 | Anderson | ............ | G06F 16/285 |
| | | | | 707/634 |
| 2014/0037214 A1* | 2/2014 | Deolalikar | ......... | G06K 9/00442 |
| | | | | 382/197 |
| 2015/0205846 A1* | 7/2015 | Aldridge | ............... | G16Z 99/00 |
| | | | | 707/602 |
| 2016/0117600 A1* | 4/2016 | Rice | ............... | G06N 7/005 |
| | | | | 706/12 |
| 2016/0342678 A1* | 11/2016 | Newman | ............. | G06F 3/0484 |
| 2017/0255617 A1* | 9/2017 | Vartakavi | ............... | G06F 16/41 |
| 2019/0235978 A1* | 8/2019 | Wu | ............... | G06F 11/2033 |
| 2020/0097997 A1* | 3/2020 | Li | ............... | G06K 9/6251 |
| 2020/0349174 A1* | 11/2020 | Yan | ............... | G06K 9/6218 |

* cited by examiner

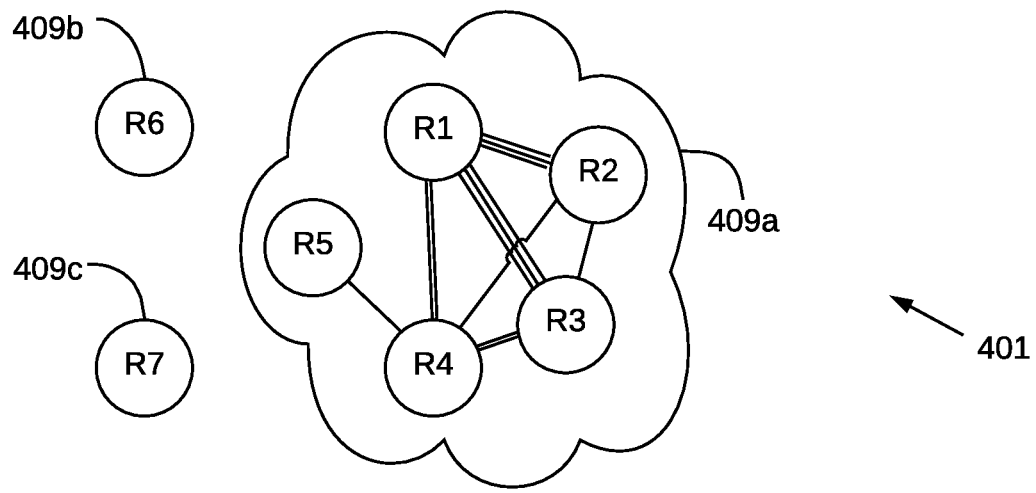
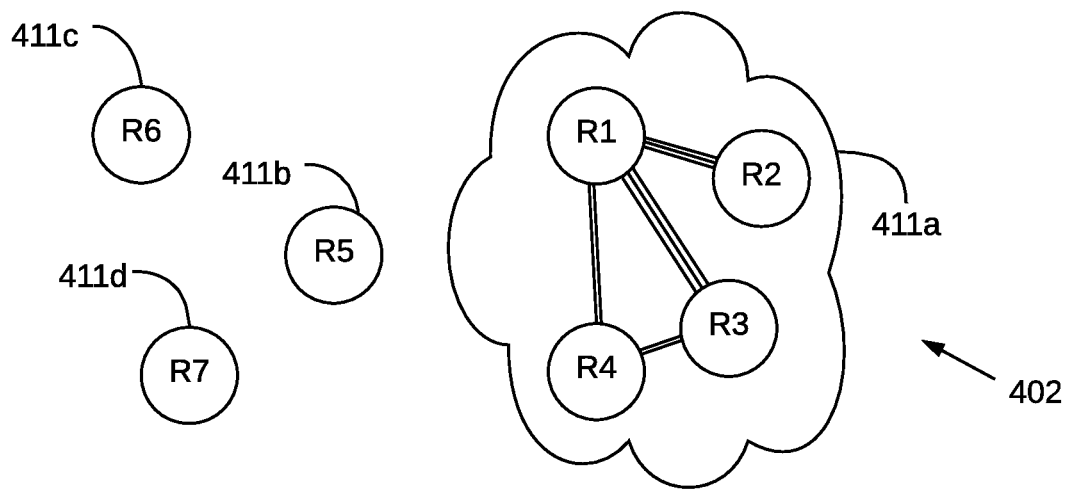
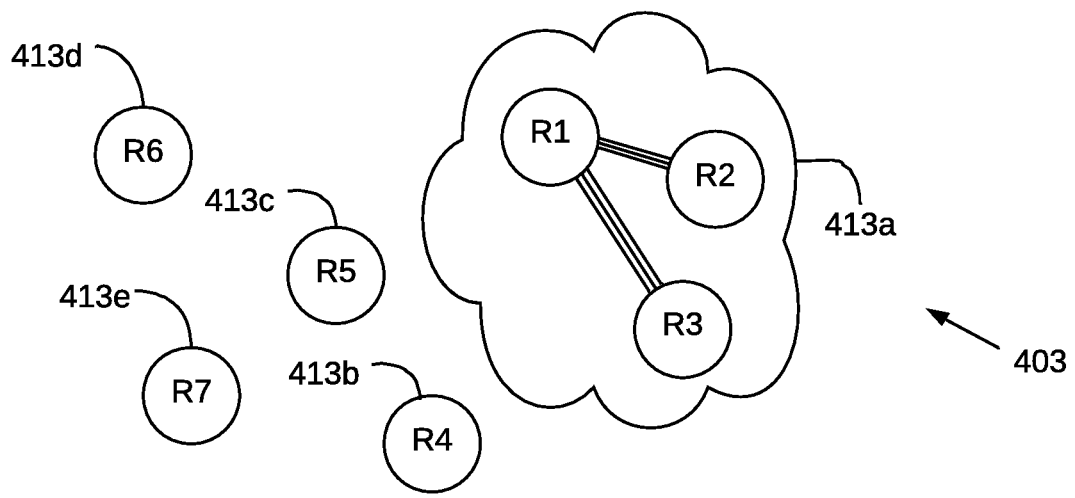
FIG. 4A

← fields 613 → records 601 ↓

112a

| Record Number | First Name | Last Name | Email | Address | City | State | Zip Code |
|---|---|---|---|---|---|---|---|
| A1 | John | Smith | jsmith12@example.com | 1234 West Elm St | Seattle | WA | 98109 |
| A2 | John | Smith | | 1234 West Elm St | Seattle | WA | 98109 |

112b

| Record Number | First Name | Last Name | Suffix | Email | Address | City | State | Zip Code |
|---|---|---|---|---|---|---|---|---|
| B1 | John | Smith | JUNIOR | jsmith12@example.com | | Seattle | WA | 98109 |

112c

| Record Number | First Name | Last Name | Suffix | DoB | Email | Address | City | State | Zip Code |
|---|---|---|---|---|---|---|---|---|---|
| C1 | John | Smith | | 1980-1-12 | jsmith12@test.com | | Seattle | WA | 98109 |
| C2 | John | Smith | Sr | 1980-1-12 | | | | | |
| C3 | John | Smith | | 1955-12-22 | | 1234 West Elm St | Seattle | WA | 98109 |
| C4 | Amy | Brown | | 1960-3-4 | amybrown34@example.com | 4321 Main st | Ames | IA | 51001 |

FIG. 6

| Record Number | Data Source | First Name | Last Name | Suffix | DoB | Email | Address | City | State | Zip Code |
|---|---|---|---|---|---|---|---|---|---|---|
| R1 | A | John | Smith | | | jsmith12@example.com | 1234 West Elm St | Seattle | WA | 98109 |
| R2 | A | John | Smith | | | | 1234 West Elm St | Seattle | WA | 98109 |
| R3 | B | John | Smith | Jr | | jsmith12@example.com | | Seattle | WA | 98109 |
| R4 | C | John | Smith | | 1980-1-12 | jsmith12@test.com | | Seattle | WA | 98109 |
| R5 | C | John | Smith | | 1980-1-12 | | | | | |
| R6 | C | John | Smith | Sr | 1955-12-22 | | 1234 West Elm St | Seattle | WA | 98109 |
| R7 | C | Amy | Brown | | 1960-3-4 | amybrown34@example.com | 4321 Main st | Ames | IA | 51001 |

FIG. 7

| Record Number | Data Source | First Name | Last Name | Suffix | DoB | Email | Address | City | State | Zip Code |
|---|---|---|---|---|---|---|---|---|---|---|
| R1 | A | John | Smith | | | jsmith12@example.com | 1234 West Elm St | Seattle | WA | 98109 |
| R2 | A | John | Smith | | | | 1234 West Elm St | Seattle | WA | 98109 |
| R3 | B | John | Smith | Jr | | jsmith12@example.com | | Seattle | WA | 98109 |
| R4 | C | John | Smith | | 1980-1-12 | jsmith12@test.com | | Seattle | WA | 98109 |
| R5 | C | John | Smith | | 1980-1-12 | | | | | |
| R6 | C | John | Smith | Sr | 1955-12-22 | | 1234 West Elm St | Seattle | WA | 98109 |

809

| Record Number | Data Source | First Name | Last Name | Suffix | DoB | Email | Address | City | State | Zip Code |
|---|---|---|---|---|---|---|---|---|---|---|
| R7 | C | Amy | Brown | | 1960-3-4 | amybrown34@example.com | 4321 Main st | Ames | IA | 51001 |

| Pair | Score | Match Category | Explanation |
|---|---|---|---|
| (r1,r6) | 4 | Strong-Match | same address |
| (r2,r3) | 2 | Weak-Match | Same zip code |
| (r2,r4) | 2 | Weak-Match | Same zip code |
| (r2,r5) | 1 | Unknown | only name match |
| (r2,r6) | 4 | Strong-Match | same address |
| (r3,r4) | 3.4 | Moderate-Match | same email alias and zip code |
| (r3,r5) | 1 | Unknown | only name match |
| (r3,r6) | 0.4 | Hard-Conflict | suffix conflict |
| (r4,r5) | 2.2 | Weak-Match | same DoB |
| (r4,r6) | 0.5 | Hard-Conflict | DoB and suffix conflict |
| (r5,r6) | 0.5 | Hard-Conflict | DoB and Suffix Conflict |

FIG. 9

| Step 1 | {R1} | {R2} | {R3} | {R4} | {R5} | {R6} |
|---|---|---|---|---|---|---|
| {R1} |  | 4.2 | 4.5 | 3.4 | 1.0 | 4.0 |
| {R2} |  |  | 2.0 | 2.0 | 1.0 | 4.0 |
| {R3} |  |  |  | 3.4 | 1.0 | 0.4 |
| {R4} |  |  |  |  | 2.2 | 0.5 |
| {R5} |  |  |  |  |  | 0.5 |
| {R6} |  |  |  |  |  |  |
1003
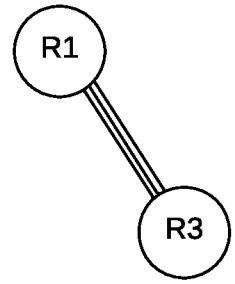
| Step 2 | {R2} | {R4} | {R5} | {R6} | {R1,R3} |
|---|---|---|---|---|---|
| {R2} |  | 2.0 | 1.0 | 4.0 | 4.0 |
| {R4} |  |  | 2.2 | 0.5 | 3.7 |
| {R5} |  |  |  | 0.5 | 2.2 |
| {R6} |  |  |  |  | 0.3 |
| {R1,R3} |  |  |  |  |  |
1006
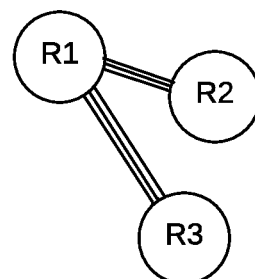
| Step 3 | {R4} | {R5} | {R6} | {R1,R2,R3} |
|---|---|---|---|---|
| {R4} |  | 2.2 | 0.5 | 3.9 |
| {R5} |  |  | 0.5 | 2.2 |
| {R6} |  |  |  |  |
| {R1,R2,R3} |  |  |  |  |
1009
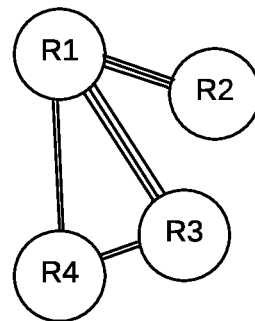
| Step 4 | {R5} | {R6} | {R1,R2,R3,R4} |
|---|---|---|---|
| {R5} |  | 0.5 | 2.2 |
| {R6} |  |  |  |
| {R1,R2,R3,R4} |  |  |  |
1012
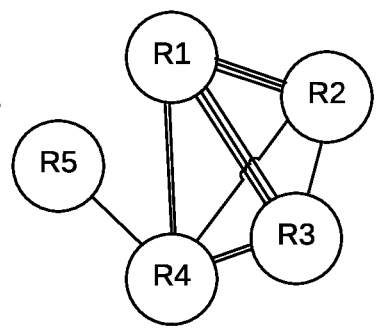
FIG. 10

| Cluster ID | Record Number | Data Source | First Name | Last Name | Suffix | DoB | Email | Address | City | State | Zip Code |
|---|---|---|---|---|---|---|---|---|---|---|---|
| c-1-1-1 | R1 | A | John | Smith | | | jsmith12@example.com | 1234 West Elm St | Seattle | WA | 98109 |
| c-1-1-1 | R2 | A | John | Smith | | | | 1234 West Elm St | Seattle | WA | 98109 |
| c-1-1-1 | R3 | B | John | Smith | Jr | | jsmith12@example.com | | Seattle | WA | 98109 |
| c-1-1-2 | R4 | C | John | Smith | | 1980-1-12 | jsmith12@test.com | | Seattle | WA | 98109 |
| c-1-2-1 | R5 | C | John | Smith | | 1980-1-12 | | | | | |
| c-2-1-1 | R6 | C | John | Smith | Sr | 1955-12-22 | | 1234 West Elm St | Seattle | WA | 98109 |
| c-3-1-1 | R7 | C | Amy | Brown | | 1960-3-4 | amybrown34@example.com | 4321 Main st | Ames | IA | 51001 |

FIG. 11

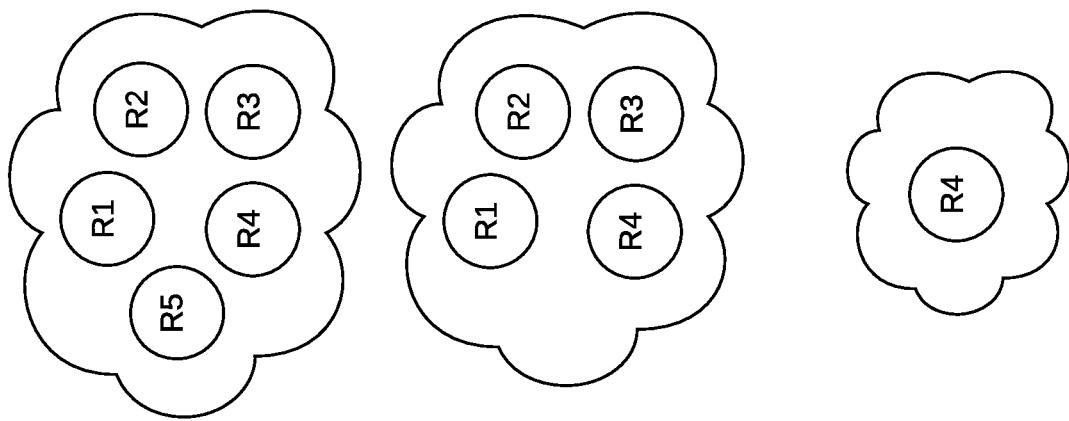
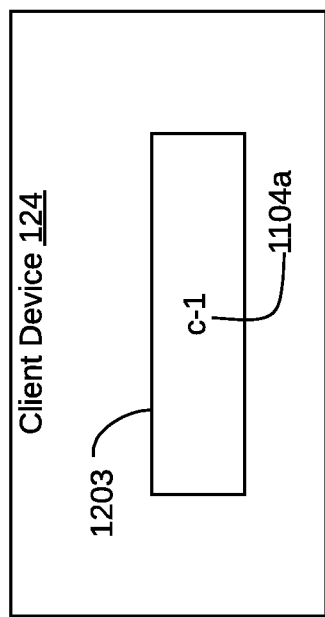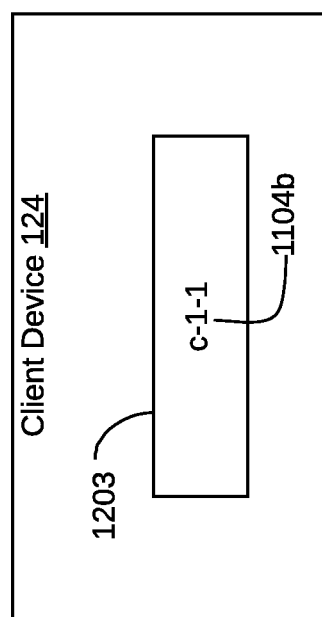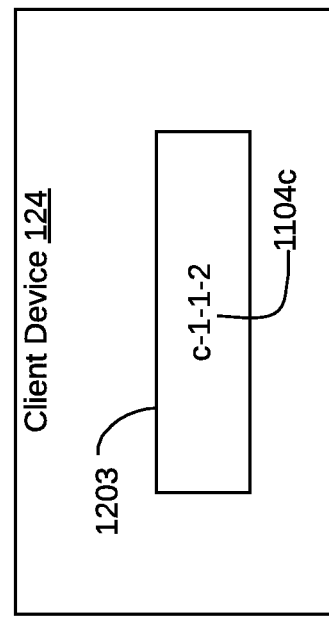
FIG. 12

US 11,003,643 B2

MULTI-LEVEL CONFLICT-FREE ENTITY CLUSTERINGS

BACKGROUND

In the course of business, large amounts of data records are collected and stored in one or more databases. These data records may reflect customer information, business records, events, products, or other records pertinent to a relevant business. These records can accumulate from a number of data sources. For example, a retail company may sell products over different channels such as online e-commerce platforms as well as physical store locations. The retail company may maintain separate customer records for each of its different retail channels.

Records may be maintained in separate database tables. Merging two database tables may be time consuming and costly. The present disclosure describes systems and methods of managing a database that overcomes a number of the drawbacks of prior art solutions. Specifically, the present disclosure relates to clustering data records that likely refer to the same real-world information. The advantages and benefits of the present disclosure will be discussed in further detail.

BRIEF DESCRIPTION OF THE DRAWINGS

Many aspects of the present disclosure can be better understood with reference to the attached drawings. The components in the drawings are not necessarily drawn to scale, with emphasis instead being placed upon clearly illustrating the principles of the disclosure. Moreover, in the drawings, like reference numerals designate corresponding parts throughout several views.

FIG. 4A is an example of a visual depiction of a hierarchical clustering generated by the software application executed in a computing environment 100 of FIG. 1 according to various embodiments of the present disclosure.

FIG. 6 is an example of data records stored in a database in a computing environment 100 of FIG. 1 according to various embodiments of the present disclosure.

FIG. 7 is an example of data records stored in a database that are subject to preprocessing in a computing environment 100 of FIG. 1 according to various embodiments of the present disclosure.

FIG. 8 is an example of two blocks of data records in a computing environment 100 of FIG. 1 according to various embodiments of the present disclosure.

FIG. 9 is an example of pairwise comparison operations and ordinal classifications performed on data records in a computing environment 100 of FIG. 1 according to various embodiments of the present disclosure.

FIG. 10 is an example of a hierarchical clustering generated by the software application executed in a computing environment 100 of FIG. 1 according to various embodiments of the present disclosure.

FIG. 11 depicts a processed database table in a computing environment 100 of FIG. 1 according to various embodiments of the present disclosure.

FIG. 12 is an example of cluster IDs provided by a client device in a computing environment 100 of FIG. 1 according to various embodiments of the present disclosure.

DETAILED DESCRIPTION

Figure 1:
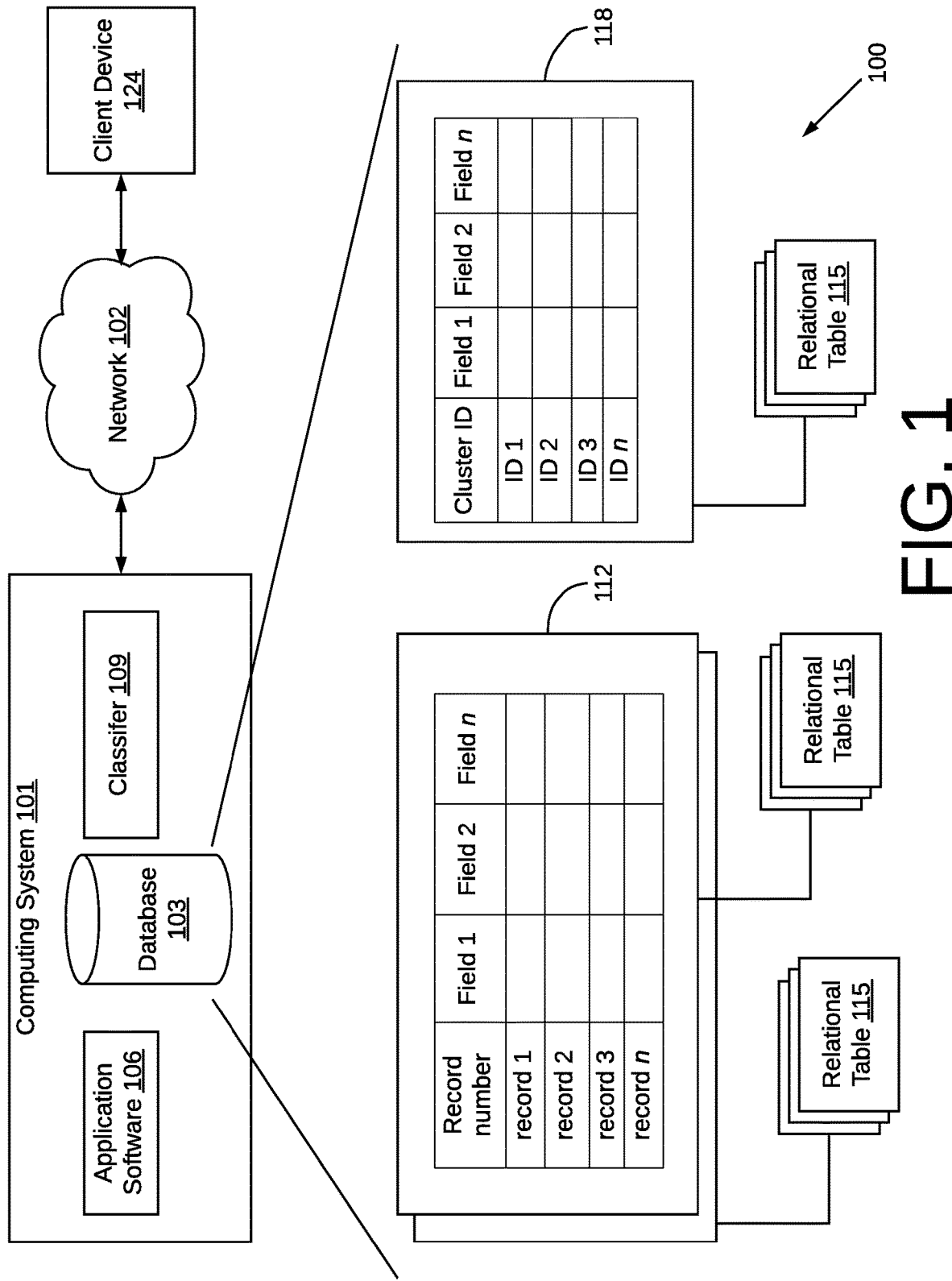
FIG. 1 is a drawing of a computing environment 100 according to various embodiments of the present disclosure.

Various embodiments of the present disclosure relate to clustering common database records that exist across one or more database tables. Clustering records can be a time consuming and burdensome process. This may be the case where there is a likelihood that redundant records exist within the two or more database tables that are being clustered. For example, two records may reflect the same user account such that they contain overlapping information, but not identical information. The present disclosure describes embodiments that employ machine learning to effectively cluster records.

The present disclosure employs hierarchical clustering of records. Within the hierarchy are different tiers, where each tier corresponds to a particular degree of confidence. For example, one or more database tables may contain records for various customers, with a likelihood of duplicative records. A lower confidence clustering scheme has a lower threshold when clustering duplicative records. This may lead to fewer, but larger, clusters. Under a lower confidence clustering scheme, there is a risk that two records that are deemed duplicative refer to different customers. A higher confidence clustering scheme, on the other hand, will have more clusters that are generally smaller in size. The benefit is that the records within a cluster are more likely to refer to the same customer while the downside is it is more likely to have different clusters represent the same customer.

By applying hierarchical clustering according to embodiments of the present disclosure, users who desire different degrees of confidence for different applications may select clusters appropriately. For example, perhaps for email marketing purposes, a lower confidence of clustering is desirable because reducing the number of clusters is important at the cost of incorrectly assuming that two records refer to the same customer. Similarly, a higher confidence of clustering is desirable in the case of communicating sensitive data in order to avoid the risk of incorrectly assuming that two records refer to the same customer.

According to various embodiments, hierarchical clustering is achieved by using an ordinal classifier to evaluate the degree that two inputs are a match. In addition, in some embodiments, hierarchical clustering involves performing conflict resolution to detect hard conflicts. The presence of a hard conflict strongly suggests an overly broad clustering and is not desirable. After generating a hierarchical clustering, hierarchical cluster identifiers (IDs) are assigned to each record to designate how the record falls within the hierarchy. The hierarchical cluster ID may include a series of values, wherein each value reflects a respective tier within the hierarchical clustering. Users can specify where in the hierarchy they prefer to be when selecting clusters of records. While the foregoing provides a high level summary, the details of the various embodiments may be understood with respect to the Figures.

FIG. 1 shows a computing environment 100 according to various embodiments. The computing environment includes a computing system 101 that is made up of a combination of hardware and software. The computing system 101 includes a database 103, a software application 106, and a classifier 109. The computing system 101 may be connected to a network 102 such as the Internet, intranets, extranets, wide area networks (WANs), local area networks (LANs), wired networks, wireless networks, or other suitable networks, etc., or any combination of two or more such networks.

The computing system 101 may comprise, for example, a server computer or any other system providing computing capability. Alternatively, the computing system 101 may employ a plurality of computing devices that may be arranged, for example, in one or more server banks or computer banks or other arrangements. Such computing devices may be located in a single installation or may be distributed among many different geographical locations. For example, the computing system 101 may include a plurality of computing devices that together may comprise a hosted computing resource, a grid computing resource and/ or any other distributed computing arrangement. In some cases, the computing system 101 may correspond to an elastic computing resource where the allotted capacity of processing, network, storage, or other computing-related resources may vary over time. The computing system 101 may implement one or more virtual machines that use the resources of the computing system 101.

Various applications and/or other functionality may be executed in the computing system 101 according to various embodiments. Also, various data is stored in the database 103 or other memory that is accessible to the computing system 101. The database 103 may represent one or more databases 103.

The components executed on the computing system 101 include a software application 106 and a classifier 109, which may access the contents of the database 103. According to various embodiments, the software application 103 is configured to generate hierarchical clusters using conflict resolution. The software application 106 employs a classifier 109 that may be integrated into the software application 109 or a separate module. The classifier 109 may be an ordinal classifier. According to various embodiments, an ordinal classifier is a software component that receives two inputs and generates at least an ordinal label that reflects a degree of match between the two inputs. For example, an ordinal label may include, but is not limited to a "Strong-Match", "Moderate-Match," "Weak-Match", "Unknown", "Hard-Conflict." An "Unknown" label represents a case where there is no match and the compared data contains no hard conflict. A "Hard-Conflict" represents a case where there is no match and the compared data is inconsistent in a manner indicative of a hard conflict. Other user-defined ordinal labels may be used to express various classifications for performing hierarchical clustering or conflict resolution.

The data stored in the database 103 includes one or more database tables 112. A database table 112 includes several records, where each record has one or more corresponding fields. When stored in a relational database 103, a database table 112 may be linked to one or more relational tables 115. For example, if an airline company maintained a database table 112 that stored customer records, there may be a relational table 115 storing the flight history for each customer. The contents of the relational table 115 links to a corresponding record using, for example, a record ID or foreign key included in the table 112.

The software application 106 executing in the computing system 101 may generate a processed database table 118 by processing one or more database tables 112. For example, the processed database table 118 may be a merged database table that is generated by de-duplicating at least one database table 112. Thus, the processed database 118 includes information that allows one or more records to be consolidated in the event they are deemed to be a match. According to various embodiments of the present disclosure, the degree of strength in a match is reflected in the merged database using, for example, a cluster ID.

According to various embodiments, the processed database table 118 is a relational database table that maintains the same relational links of the one or more database tables 112 after it is processed.

The computing environment 100 also includes one or more client device(s) 124. A client device 124 allows a user to interact with the components of the computing system 101 over a network 102. A client device 124 may be, for example, a cell phone, laptop, personal computer, mobile device, or any other computing device used by a user. The client device 124 may include an application such as a web browser or mobile application that communicates with the software application 106 to access, manipulate, edit, or otherwise process database tables 112. The software application 106 sends and receives information to and from the client device 124.

Next, a general description of the operation of the various components of the computing system 101 is provided. Various businesses or other entities utilize the computing system to store information in a database 103. For example, businesses may want to store records reflecting customers, products, transactions, events, items, or any other piece of information relevant to the business. Records are collected over time and stored in one or more database tables 112. For example, when a business gets a new customer, a software program may create a record reflecting the new customer. This record may include the customer's name, address, contact information, or any other information that identifies the customer. Such information is stored as fields within a database table.

In practice, a single record is sufficient to represent a customer. However, it is possible that duplicate (e.g., redundant) records are inadvertently or unintentionally created and/or exist within one or more databases 103. For example, a customer may register with a business via an online portal, which creates a customer record for that customer. Later, the same customer may inadvertently register again with the online portal, thereby creating a redundant customer record in the database table 112. Also, a company may have a first database table 112 for its brick and mortar customers and a second database table 112 for its e-commerce customers. It is possible that the same customer has a corresponding record in these two different database tables 112. As another example, two businesses maintaining their own customer records may merge such that the same customer may exist in two different database tables 112. The resulting processed database table could have redundant records reflecting the same customer.

Duplicate records are not necessarily identical. While they possess overlapping information, there may be field values that are different. For example the field values of "Joe" and "Joseph" are not identical, yet they may be part of duplicate records. Because multiple records may represent the same real-world entity, it is desirable to group related records together so that they are clustered. A classifier 109 may be used to determine whether two records should be classified as a match based on the degree of related or common field values between the two records. The classifier 109 may determine the likelihood that a pair of records represent the same real-world entity such as, for example, a particular customer. The classifier 109 may calculate a raw score that quantifies the degree of similarity between two records. The raw score may be converted to a normalized score. An ordinal label may be assigned to the normalized score. An example of this is depicted in Table 1 below, where a normalized score, x, is assigned an ordinal label if it falls within a particular range:

TABLE 1

| Normalized Score (X) | Ordinal Label |
| --- | --- |
| X ≤ 1 | Hard-Conflict |
| 1 < X ≤ 2 | Unknown |
| 2 < X ≤ 3 | Weak-Match |
| 3 < X ≤ 4 | Moderate-Match |
| 4 < X ≤ 5 | Strong-Match |

When performing a pairwise comparison of records, different combinations of field values among the two records are compared. For example, in one embodiment, the value of F1 of a first record is compared to the value of F1 of a second record, then the value of F2 of the first record is compared to the value of F2 of the second record, and so on. The comparison of two values yields a feature with respect to the record pair. A feature is a programmed calculation taking as inputs M records and/or other data such as external metadata and returns a numeric value as output. The variable M=2 in the case of handling a record pair. That numeric output may be, for example, a real value bounded between 0 and 1, or a binary value with two distinct outputs, 0 being considered "false" and 1 being considered "true." A feature score is the specific output value generated by a feature for a given set of records or record pair. A feature score refers to the degree that two field values are the same.

For example, comparing the first name field value of "Joseph" to the first name field value of "Joe" may yield a "first_name_match" feature having a feature score of 0.88 on a scale of 0 to 1, where 0 means no-match and 1 means a perfect match. In other embodiments the first name feature may be a binary value of "true/T", meaning match, or "false/F", meaning no-match. In addition, features may be determined based on a combination of field values. Here, a feature may be "full_name_match," which is a feature based on concatenating a first name field value with a last name field value.

Features are combined to form a feature signature. The feature signature quantifies the extent that a pair of records likely represent the same real-world entity. As an example, a feature signature may be made up of features such as "first_name_match," "last_name_match," "full_name_match," "email_address_match," etc. A feature signature resulting from a pairwise comparison is inputted into a classifier 109 to determine an ordinal label for the two inputs.

While the description above discusses pairwise comparisons between two records, hierarchical clustering, according to various embodiments, performs pairwise comparisons between inputs that may be clusters of records. A cluster may refer to a group of two or more records as well as a single record. A cluster of one record is referred to as a singleton cluster. For example, a pairwise comparison may compare one singleton cluster (a first input) to a cluster of multiple records (a second input). As described in further detail below, using clusters as inputs to a classifier 109 provides hierarchical clustering.

Figure 2:
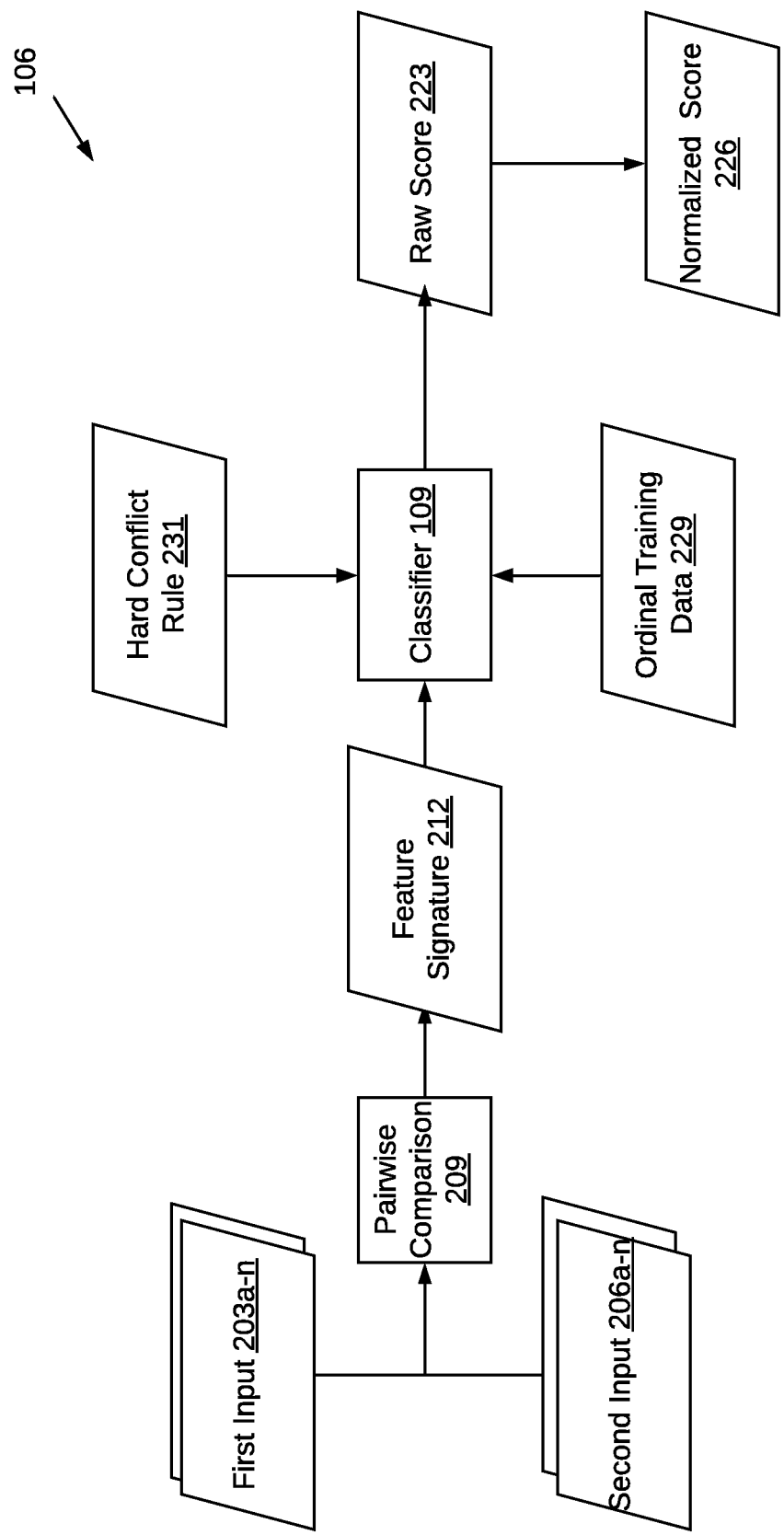
FIG. 2 is a flowchart illustrating an example of the functionality of the software application using a classifier 109, executed in a computing environment 100 of FIG. 1 according to various embodiments of the present disclosure.

FIG. 2 is a flowchart illustrating an example of the functionality of the software application 106 using a classifier 109, executed in a computing environment 100 of FIG. 1 according to various embodiments of the present disclosure. The software application 106 is configured to identify a match status for record pairs within a set of records. The set of records may be organized into connected components by positive edges. A positive edge refers to a matched record pair or otherwise a record pair having a match status higher than a threshold level. A connected component refers to a subset of records derived from the records in one or more database tables. This is discussed in further detail below.

The software application 106 selects a first input 203 and a second input 206 to perform a pairwise comparison 209. An input may be a cluster made up of multiple records or a singleton cluster. The first input 203 and second input 206 may be selected by the software application according to a hierarchical clustering algorithm that iteratively selects inputs, as discussed in various embodiments below.

Once the two inputs are selected, the software application 106 performs a pairwise comparison 209. This may involve comparing the field values between the first input 203 and second input 206 to determine a feature for a particular field or set of fields. The pairwise comparison 209 generates a feature signature 212 which may be made up of various features of the fields' values being compared.

The feature signature 212 reflects how two inputs are similar or dissimilar based on the extent the field values are similar. In other words, the feature signature 212 corresponds to a series of features between a pair of inputs being compared. A first pair of inputs 203a, 206a may have the same feature signature 212 as a different set of inputs 203b, 206b even though the first pair represents a different entity than the second pair. In this case, it is inferred that the first pair of inputs 203a, 206a are similar to each other in the same way that the second pair of inputs 203b, 206b are similar to one another. For example, given the trivial set of features "Fuzzy Last Name match" and "Fuzzy First Name match", the first pair of inputs 203a, 206a {"Stephen Meyles", "Steve Myles"} will generate a feature signature of [1 1], where "1" refers to a binary value indicating a match. In addition, a second pair of inputs 203b, 206b {"Derek Slager", "Derke Slagr"} will also generate a feature signature 212 of [1 1]. This does not necessarily mean that the first pair of inputs 203a, 206a are related to the same real-world identity as the second pair of inputs 203b, 206b. Instead, it suggests that the inputs have the same data variations (fuzzy matches of first and last name). Records with the same data variations will have the same signature.

After generating the feature signature 212, the software application 106 uses a classifier 109 (FIG. 1) to perform a classification of the feature signature 212. This classification process calculates a raw score 223 that correlates to the strength that a particular feature signature indicates a match. The raw score may be any range of numbers. The raw score quantifies the confidence that a particular feature signature 212 represents two inputs that refer to the same real-world entity.

In some embodiments, the raw score 223 may be normalized to a normalized score 226. In addition, an ordinal label may be assigned to the raw score 223 or normalized score 226, as discussed above. To elaborate further, after calculating raw score 223 or normalized score 226, the software application 106 compares the raw score 223 or normalized score 226 to predetermined threshold ranges to yield a corresponding ordinal label that classifies the feature signature 212.

According to various embodiments, the classifier 109 is configured using ordinal training data 229 and/or hard conflict rules 231. Ordinal training data 229 is generated from users who manually label test data to build business logic (e.g., a history) of how people would classify two inputs. The classifier 109 is "trained" in the sense that it applies ordinal training data 229 and extrapolates it and applies it to new combinations of input pairs 203a, 206a. For example, if the ordinal training data 229 indicates that a particular feature 212 was repeatedly labeled as a "Moderate-Match" among a plurality of other labels, then the classifier will generate a raw score 223 that corresponds to the ordinal label of "moderate-match."

According to various embodiments, the classifier 109 can classify a pair of records or a pair of clusters. The classifier 109 allows each field to be a vector, for example, an "email" field may be ["r-1@test-one.com" "r-1@test-two.com" ]. When applying the classifier 109 to cluster pairs, each semantic field is a concatenation of the semantic values from each cluster member. For example, a first input made of two records, R-1 and R-2, may have email address values of "emai-r-1@test.com" and "email-r-2@test.com", respectively. The email field for this cluster becomes ["email-r-1@test.com", "email-r-2@test.com" ].

When configured to apply hard conflict rules 231, the classifier may analyze the feature signature 212 or the input pair 203a, 206a and check whether a rule is violated. An example of a hard conflict rule is whether the field values for a "social security number" field is an exact match. If it is not an exact match, the classifier will apply an ordinal label of "Hard-Conflict" regardless of the remainder of the feature signature 212. If there are real-world scenarios where two records should never be clustered, it is appropriate to apply a hard conflict rule.

Figure 3:
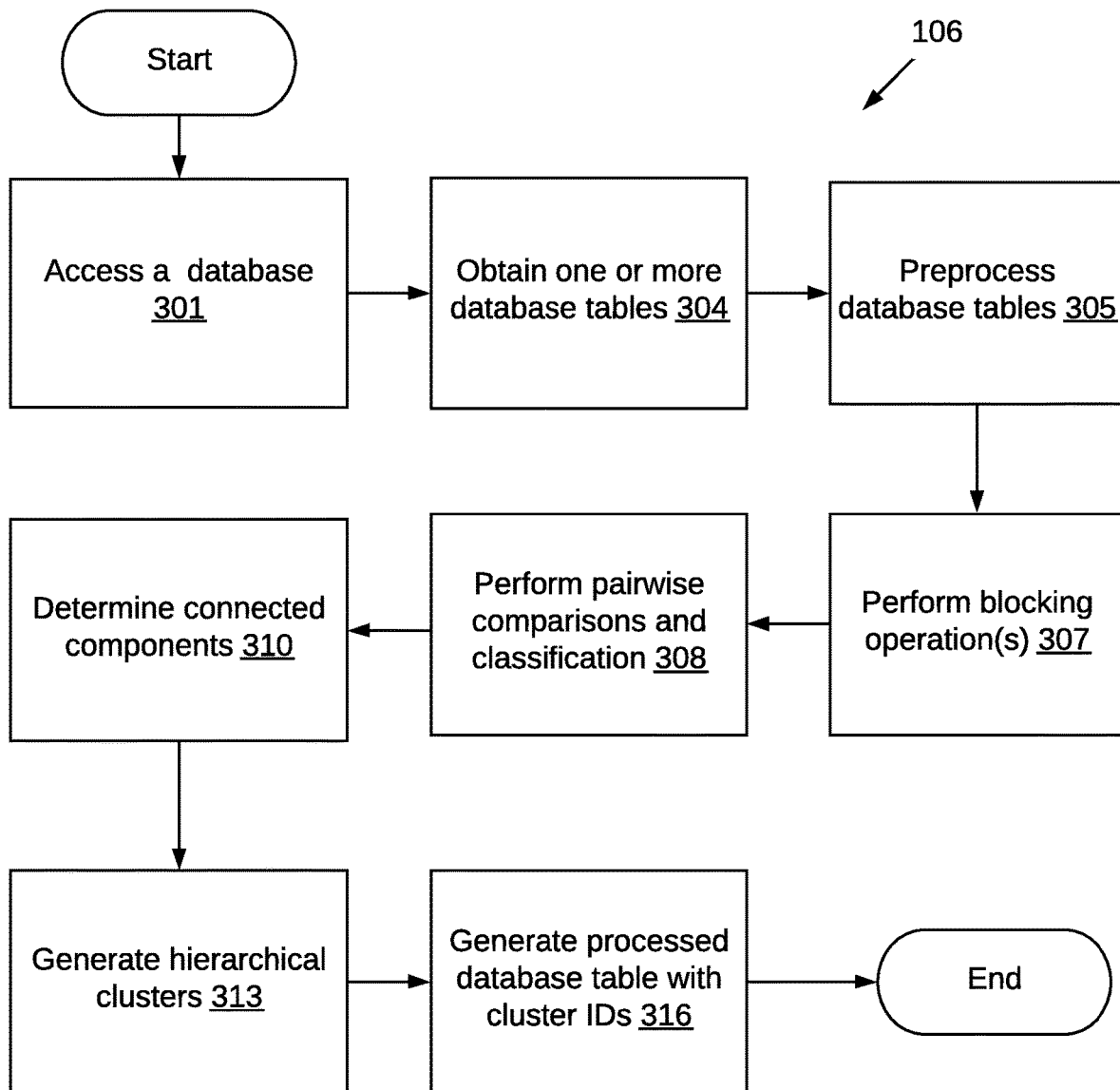
FIG. 3 is a flowchart illustrating an example of the functionality of the software application executed in a computing environment 100 of FIG. 1 performing hierarchical clustering of data records with conflict resolution according to various embodiments of the present disclosure.

FIG. 3 is a flowchart illustrating an example of the functionality of the software application 106 executed in a computing environment 100 of FIG. 1 performing hierarchical clustering of data records with conflict resolution according to various embodiments of the present disclosure. It is understood that the flowchart of FIG. 3 provides merely an example of the many different types of functional arrangements that may be employed to implement the operation of the portion of the software application 106 as described herein. As an alternative, the flowchart of FIG. 3 may be viewed as depicting an example of elements of a method implemented in the computing system 101 (FIG. 1) according to one or more embodiments.

At 301, the software application 106 accesses a database 103 (FIG. 1). At 304, the software application 106 obtains one or more database tables 112 (FIG. 1). For example, the software application 106 may download one or more database tables 112 to local memory or cache. In other embodiments, the software application 106 may present credentials to gain permission to access one or more database tables 112. The one or more database tables 112 include records that are subject to hierarchical clustering.

In the event there are multiple database tables 112, at 305, the software application 106 preprocesses the database tables 112. For example, the software application 106 may fuse or otherwise concatenate the database tables in a manner described in co-pending U.S. patent application Ser. No. 15/729,931, which is titled, "EFFECTIVELY FUSING DATABASE TABLES" and which is incorporated by reference in its entirety.

At 307, the software application 106 performs one or more blocking operations 307. A blocking operation is used to identify a block of records among the one or more database tables 112 that are likely to refer to the same real-world entity. A blocking operation may provide a rough estimate of what records should be clustered together. A blocking operation may use a blocking rule that is based on whether the records across one or more database tables 112 contain an exact match with respect to at least one field in the at least one database table. For example, a blocking rule may check whether there is a first name and last name match across all records. This may form a block of records, which serves as a starting point for performing hierarchical clustering.

According to various embodiments, different blocking operations are performed before performing hierarchical clustering. Records in one or more database tables 112 may be blocked according to a first blocking operation such as a name match rule and a second blocking operation such as an email match rule. Thus, a record within a database table 112 may be associated with one or more blocks.

At 308, the software application 106 performs pairwise comparisons and classifications for a given block of records. According to various embodiments, the software application 106 operates in accordance with the discussion above of FIG. 2. The software application 106 invokes a classifier 109 (FIG. 1) to classify various inputs 203, 206 (FIG. 2). The software application 106 performs pairwise comparisons and classifications on all record pairs within each block of records.

At 310, the software application 106 determines a subset of records such as, for example, a a connected component based on the positive edges from the classification results. The concept of a connected component refers to grouping records together based on whether there is a sufficiently strong match between records pairs and by applying transitive association. For example, If R1 and R2 have a match and R2 and R3 have a match, then the software application 106 connects R1, R2, and R3 through transitive association. By performing one or more blocking operations, the software application 106 determines a connected component (e.g., R1, R2, and R3) which is a set of connected records within the blocks.

To elaborate further, the software application 106 collects the positive record pairs (record pairs with the classifier score higher than the pre-specified threshold). After that, connected components are algorithmically constructed from the positive record pairs. In each connected component, every record is connected with others through one or more positive edges (to the extent one exists) directly or transitively. The software application 106 continues across different connected components until there is no positive edge left.

Figure 5A:
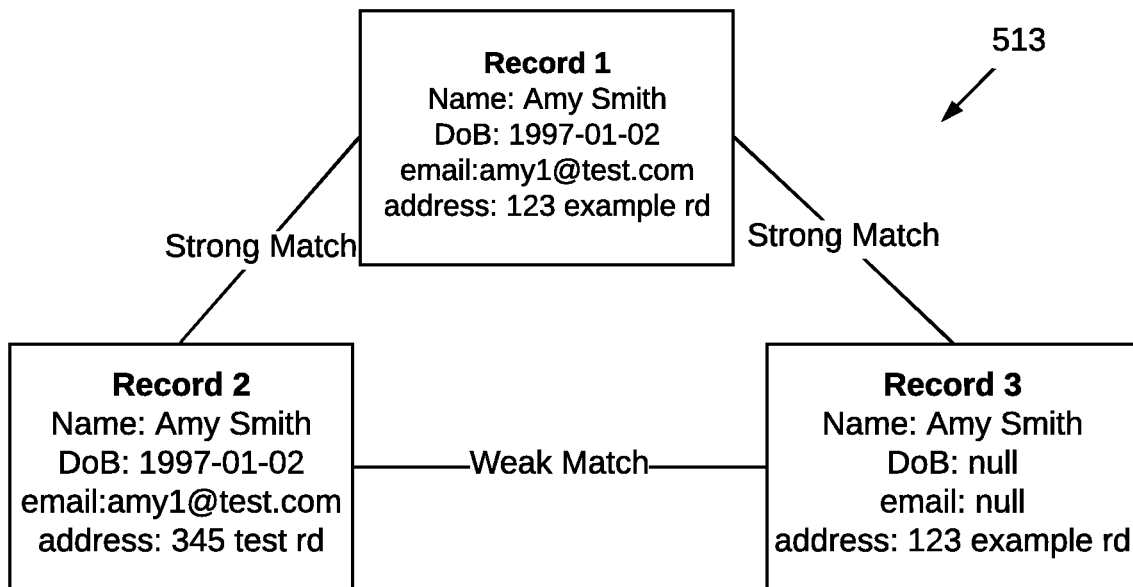
FIG. 5A is an example of an acceptable triplet according to various embodiments of the present disclosure.

Since records are allowed to be connected through transitivity inside the connected component, sometimes hard conflicts will occur (e.g., FIG. 5B), and sometimes not (e.g., FIG. 5A). Each connected component becomes the input of the hierarchical clustering algorithm. As discussed below, hierarchical clustering is applied to each connected component to further partition the component and resolve any hard-conflict it detects.

At 313, the software application 106 generates hierarchical clusters for a given connected component. An example of hierarchical clusters is presented with respect to FIG. 4A. Hierarchical clusters may be stored as a key-value database as the hierarchical clusters are being generated by the software application 106. At 316, the software application 106 generates a processed database table 118 (FIG. 1). In some embodiments, the software application 106 generates hierarchical cluster IDs for each record and assigns them to the records in the processed database table 118. The use of hierarchical cluster IDs is discussed in greater detail with respect to FIGS. 11 and 12.

The following is an example of applying the flowchart of FIG. 3 to a database table made up of at least records Ra, Rb, Rc, and Rd. At 304, one or more database tables are accessed to obtain records Ra through Rd. The database tables are processed at 305 to normalize records Ra through Rd so that their field values may be compared. At 307, two blocking operations are performed on the processed database table. A first blocking operation blocks records according to name while a second blocking operation blocks records according to zip code. As a result, Ra, Rb, and Rc form a first block while Ra and Rd form a second block. At 308, the various record pairs of the first block ({Ra, Rb}, {Ra, Rc}, {Rb, Rc}) are compared and classified. The same applies to the second block where Ra is compared to Rd. The record pairs {Ra, Rb} and {Ra, Rd} have match labels that exceed a threshold level. For example, they may be correspond to a Strong-Match, Moderate-Match, or Weak-Match or any other status that indicates a minimum status for a match. The other records pairs, {Rb-Rc} and {Ra-Rc} correspond to a low match status, an unknown match status or a hard conflict, below the threshold level established as a minimum status for a match. At 310, a connected component is created from Ra, Rb, and Rd. The connected component is derived from the various records in the database by blocking, classifying, and evaluating match scores. The connected component of Ra, Rb, and Rd removes records having a hard conflict or records with sufficiently low match statuses. At 313, the connected component is subject to hierarchical clustering. This is described in further detail with respect to FIG. 13.

FIG. 4A is an example of a visual depiction of a hierarchical clustering generated by the software application 106 executed in a computing environment 100 of FIG. 1 according to various embodiments of the present disclosure. In this example, there are seven records R1-R7. These records may have been identified from one or more database tables 112 (FIG. 1) using a blocking operation and determining a connected component. Records R1-R7 represent records that have a likelihood of referring to the same entity such as a particular customer account.

A cluster of multiple records is depicted as a cloud bubble drawn around multiple records. Single records form singleton clusters. The strength of a match between two records is depicted by one or more lines between two records. Stronger matches are depicted with more lines while weaker matches are depicted with fewer lines. For example, R1 and R3 form a strong match, as depicted with 3 lines while R2 and R4 depict a weaker match with one line.

The hierarchical clustering in this example is made up of multiple tiers where a bottom tier 401 applies a lower confidence matching, a middle tier 402, applies a moderate confidence matching, and an upper tier 403 applies a higher confidence matching. When a lower confidence matching scheme is applied, the software application 106 is configured to cluster records that have a relatively weaker link. Accordingly, this may yield fewer clusters that are generally larger in size.

In the lower tier 401, the lower confidence matching yields a first cluster 409a made up of records R1-R5, a second cluster 409b made up of record R6 and a third cluster 409c made up of record R7. Within the tier, the seven records R1-R7 have been consolidated into three groups or clusters. Consolidating records can lead to downstream processing efficiency depending on how the end user wishes to use the records. However, the tradeoff is that the clustering may include weaker matches.

In the middle tier 402, the moderate confidence matching yields a first cluster 411a made up of records R1-R4, a second cluster 411b made up of record R5, a third cluster 411c made up of record R6, and a fourth cluster 411d made up of record R7. Within the tier, the seven records R1-R7 have been consolidated into four clusters. When compared to a lower tier 401, the moderate tier 402 has more clusters, where the cluster size is smaller. For example, the first cluster 409a of the lower tier 401 is split into two clusters 411a and 411b in the middle tier 402. Under the moderate matching scheme of the middle tier 402, weaker links, such as the link between R4 and R5 are not permitted to exist within a cluster.

In the upper tier 403, the higher confidence matching yields a first cluster 413a made up of records R1-R3, a second cluster 413b made up of record R4, a third cluster 413c made up of record R5, a fourth cluster 413d made up of record R6, and a fifth cluster 413e made up of record R7. Within the tier, the seven records R1-R7 have been consolidated into five clusters. When compared to a lower tier 401 and moderate tier 402, the upper tier has more clusters, where the cluster size is smaller. Under the upper tier, only strong matches are permitted when forming clusters.

According to various embodiments, the software application 106 connects various records across different tiers 401, 402, 403 using a key value database. A processed database table 118 (FIG. 1) may be generated from the key value database.

Figure 4B:
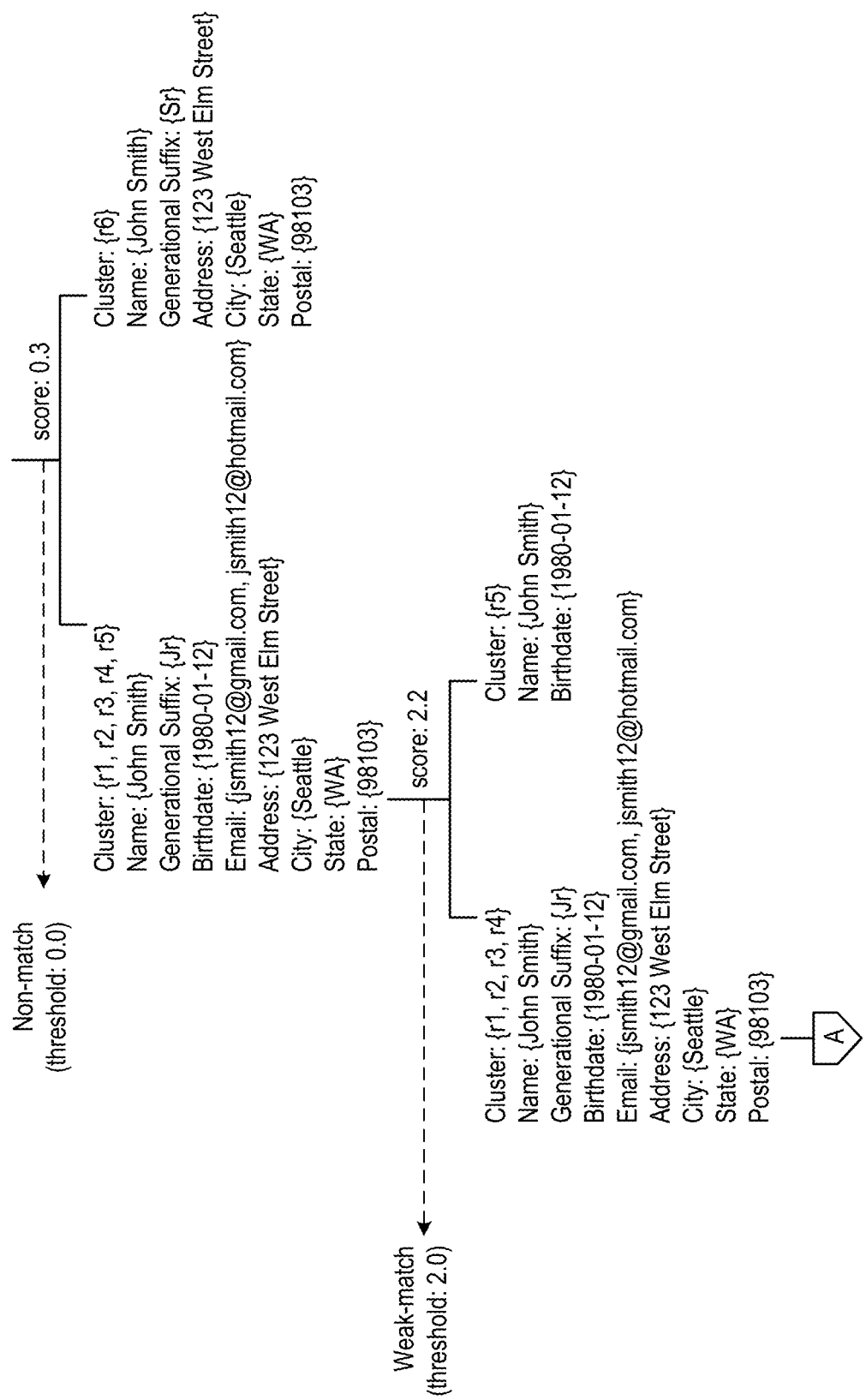
FIGS. 4B and 4C illustrate a dendrogram showing a hierarchical clustering generated by the software application executed in a computing environment 100 of FIG. 1 according to various embodiments of the present disclosure.
Figure 4C:
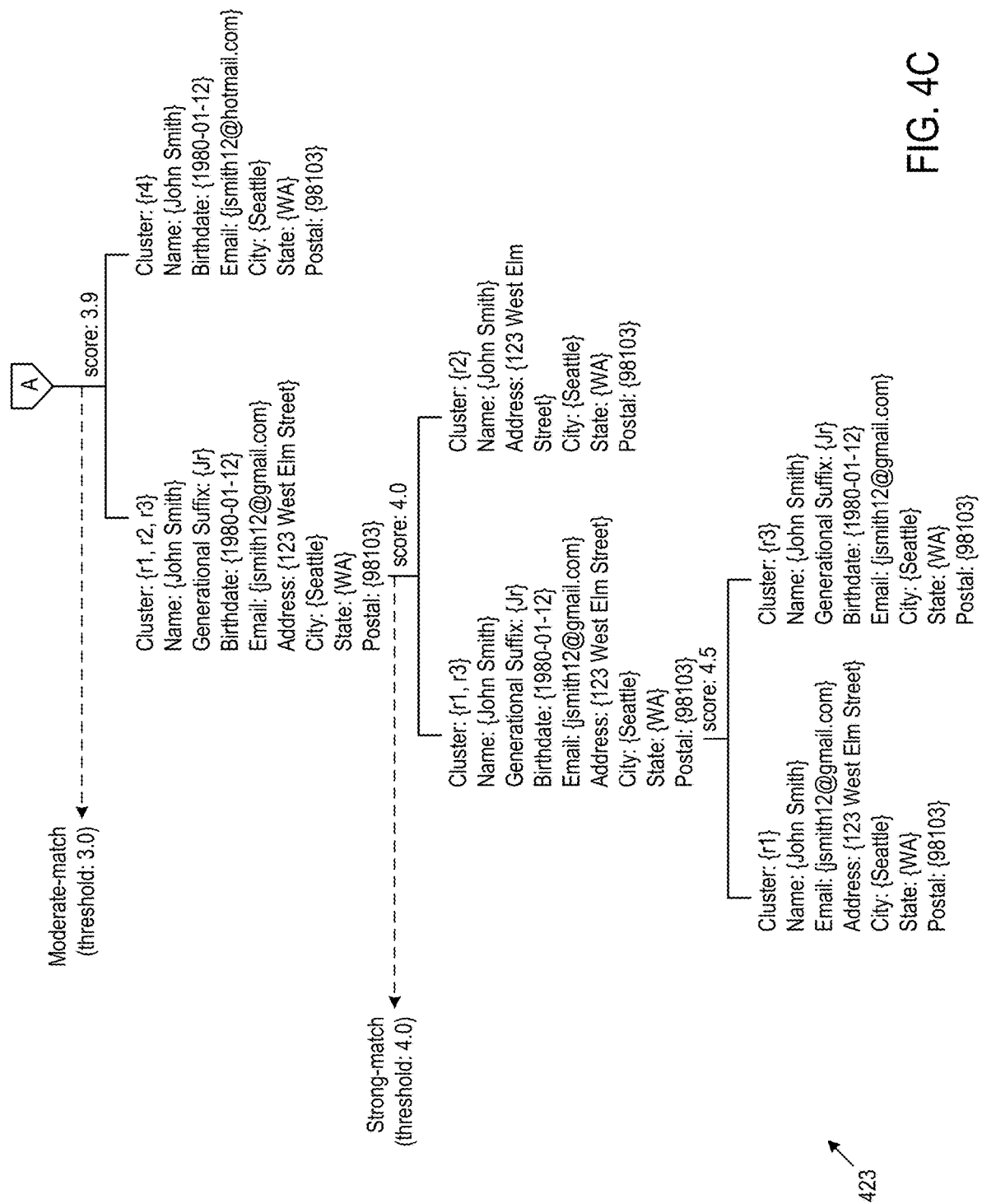

FIGS. 4B and 4C Illustrate a dendrogram 423 showing a hierarchical clustering generated by the software application executed in a computing environment 100 of FIG. 1 according to various embodiments of the present disclosure. The dendrogram provides examples of values that demonstrate various degrees of match levels. For example, the hierarchical clustering ranging from a "Strong-Match" tier towards the bottom of the dendrogram 423, a "Moderate-Match" tier, and a "Weak-Match" tier towards the top of the dendrogram 423. The top of the dendrogram depicts the presence of a hard conflict.

Figure 5B:
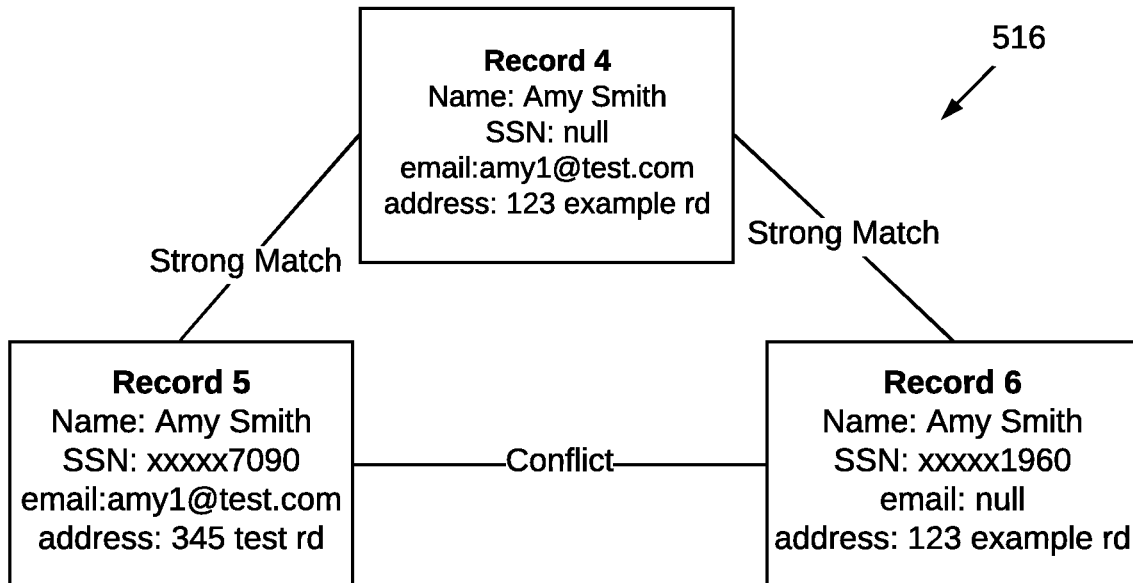
FIG. 5B is an example of a triplet with a hard conflict according to various embodiments of the present disclosure.

FIGS. 5A and 5B show the potential for hard conflicts when clustering records. The potential for a hard conflict occurs when at least three records (a triplet) are grouped together. FIG. 5A is an example of an acceptable triplet according to various embodiments of the present disclosure. FIG. 5A illustrates a case where a hard conflict does not arise. FIG. 5A depicts a triplet 513 with Record 1, Record 2, and Record 3, R1-R3, respectively. R1 and R2 form a strong match based on the results of a classifier 109 (FIG. 1). R1 and R3 also form a strong match based on the results of a classifier 109. Clustering may encompass the notion of transitive enclosure where R2 and R3 are deemed a match for the reason that they both, when taken individually, have a strong match to the same record, R1.

Rather than automatically clustering R2 and R3 based on transitive enclosure, various embodiments of the present disclosure are directed to performing conflict resolution to evaluate whether R2 and R3 should be clustered together. In FIG. 5A, R1 and R2 form a weak match. For example, a pairwise comparison 209 (FIG. 2) may yield a feature signature 212 (FIG. 2) that is classified as a weak match. This is not a binary classification, but rather an ordinal classification. A weak match is not a hard conflict. For example, R1 and R2 are similar because the name fields are an exact match. The addresses are not a match under an exact match comparison or fuzzy match comparison. However, because customers may move from one address to another, it is reasonably plausible that R1 and R2 refer to the same entity (e.g., a specific customer named "Amy Smith"). Because there is no hard-conflict, R1, R2, and R3 would be clustered together.

Embodiments of the present disclosure seek to avoid hard conflicts. Without proper treatment of the transitivity, a connected component can grow into a long chain or lead to an even more degenerate phenomenon, black hole clusters. A black hole cluster usually starts with records having matches where such records have a variety of different field values. Once formed, it begins to pull in an increasing amount of matched records, and as the cluster continues to grow, the matched records it pulls in grow inordinately. It is very problematic because it will erroneously "match" more and more records, escalating the problem. Thus, by the end of the transitive closure, one might end up with black hole entities with several records belonging to multiple different entities.

FIG. 5B is an example of a triplet with a hard conflict according to various embodiments of the present disclosure. FIG. 5B depicts a triplet 516 made up of R4, R5, and R6. R4 and R5 form a strong match and R4 and R6 form a strong match. When applying ordinal classification to R5 and R6, the match label is not a "Weak-Match," rather it is a "Hard-Conflict." Specifically, the social security numbers (SSN) for R5 and R6 are not the same. It is safe to assume that R5 and R6 refer to different entities. Using this information the software application 106 will not cluster together R4-R6 given the hard conflict. According to various embodiments, the software application 106 will cluster together either R4-R5 or R4-R6 depending on which pair has the higher match score.

FIGS. 6-11 build on an example that demonstrates various embodiments of the present disclosure. Beginning with FIG. 6, this is an example of data records stored in a database in a computing environment 100 of FIG. 1 according to various embodiments of the present disclosure. As shown in FIG. 6, there are three database tables 112a-c each containing at least one record. Some records may refer to the same entity while some may not. The software application 106 is configured to perform hierarchical clustering for the records existing in one or more database tables 112a-c.

Specifically, a database table includes one or more records 601, where each record has one or more fields 613. A record 601 may or may not have all its fields 613 populated. For example, record A2 has a null email field. Each record 601 is intended to be dedicated to a real-world entity. For example, record A1 represents an individual named "John Smith" and record C4 represents an individual named "Amy Brown." Records 601 contain different information such that the field values are not identical, even though they may reflect the same real-world entity. For example, in the email field of record A1 and record C1 have different values. However, it is possible that records A1 and C1 represent the same real-world entity, which is an individual named John Smith. It is also possible that records A1 and A2 represent different individuals even though some of the field values are the same.

As discussed above with respect to FIG. 3, the software application 103 may access a database 103 (FIG. 1) and obtain the database tables 112a-c.

FIG. 7 is an example of data records stored in a database that are subject to preprocessing in a computing environment 100 of FIG. 1 according to various embodiments of the present disclosure. For example, in relation to FIG. 3, the software application 106 (FIG. 1) may preprocess 305 database tables 112a-c prior to performing a blocking operation.

Preprocessing may involving concatenating multiple database tables 112a-c into a single table for subsequent processing. In various embodiments, the fields of a concatenated database table are semantic fields such that they are normalized across a several database tables 112a-c. For example, one database table 112 may have its F2 field originally called "last_name" while a different database table 112 may have its F2 field originally called "surname." By using semantic fields, various database tables 112 conform to a universal format of identifying its fields. This way, the software application 106 (FIG. 1) understands that the "last_name" field of one database table 112 maps to the "surname" field of a different database table 112. The database 103 (FIG. 1) may store a lookup table that maps original fields to semantic fields in order to normalize the fields across multiple database tables 112.

Moreover, field values may be normalized across one or more database tables. The field "Suffix" refers to a general suffix. The values of this field may be normalized to convert all values into an abbreviation format. For example, "JUNIOR" is converted into "Jr".

FIG. 8 is an example of two blocks of records in a computing environment 100 of FIG. 1 according to various embodiments of the present disclosure. For example, in relation to FIG. 3, the software application 106 (FIG. 1) may perform one or more blocking operations 307.

As part of the blocking operating 307, the software application 106 may coarsely select records that share some related information and which could represent the same real-world entity. For example, a blocking function may operate to determine if records are sufficiently similar enough that they might be classified as a related record pair. This may involve determining which field values are similar or are the same. One example of a blocking function is to compare a "social security number (SSN)" field. Two records having the same SSN field values likely means that the two records form a related pair. Another example of a blocking function is to compare the first three characters of a first name field and first three characters of a last name field between two records. By performing a plurality of blocking operations, a relatively large set of records is reduced in a set of blocks that making a clustering analysis more efficient. According to various embodiments, a blocking operation employs a simple rule check as opposed to a more rigorous classification process.

After performing one or more blocking operations, individual records associated with one or more blocks are connected together to form a connected component. In the example of FIG. 8, records R1-R6 have been connected together to form a first connected component 809 and record R7 forms a second connected component 812. The first connected component 809 may be determined from applying one or more blocking operations. A simple blocking rule, for example, may yield this result, such as, for example, first_name_match and last_name_match. After identifying each block, the software application 106 builds connected components 809 and performs hierarchical clustering inside each connected component 809. Hard conflicts formed through transitivity are resolved by further partitioning the component.

FIG. 9 is an example of pairwise comparison operations and ordinal classifications performed on data records in a computing environment 100 of FIG. 1 according to various embodiments of the present disclosure. For example, in relation to FIG. 3, the software application 106 (FIG. 1) may perform pairwise comparisons and classifications 310 for a given connected component such as records R1-R7, which is described as a first connected component 809.

FIG. 9 depicts a first set of classifications 902 performed on candidate record pairs taken from one or more blocks of records. In this example, the software application 106 identifies each record in a connected component, which is records R1-R7. Then, it lists out each combination of record pairs to perform pairwise comparisons as shown in the "Pair" column. Each pair is compared and then classified to yield a score, such as a raw score 223 (FIG. 2) and/or normalized score 226 (FIG. 2). The example in FIG. 9 depicts a normalized score ranging from 0 to 5 in the "score" column. The score corresponds to an ordinal classification under the "match category." Unlike binary classifiers, the ordinal classification process, according to embodiments of the present disclosure, identifies a degree of match as well as the presence of a hard conflict.

The classifier 109 may be trained using ordinal training data 229 (FIG. 2) to determine the degree of match as well as the presence of a hard conflict. For illustrative purposes, FIG. 9 shows an "explanation" as to why a particular pair of inputs has its corresponding classification. This explanation is based on the way the classifier was trained as well as the application of hard conflict rules 231 (FIG. 2).

The first set of classifications 902 represents a first iteration in the hierarchical clustering scheme, according to various embodiments. As described in the following figures, an initial cluster is formed as a result of this first set of classifications 902 and then the process is repeated using the records of the connected component and the initial cluster.

FIG. 10 is an example of a hierarchical clustering generated by the software application 106 executed in a computing environment 100 of FIG. 1 according to various embodiments of the present disclosure. FIG. 10 builds on FIGS. 6-9 by showing several iterations of pairwise comparisons and classifications to generate a hierarchical clustering. Specifically, FIG. 10 shows a first iteration 1003 using the results of a first set of classifications 902 (FIG. 2). It also shows a second iteration 1006, a third iteration 1009, and a fourth iteration 1012. As the software application 106 performs each iteration 1003, 1006, 1009, 1012, the software application 106 develops a hierarchical clustering, as shown in FIG. 10. These iterations 1003, 1006, 1009, 1012 are performed as part of the operation to generate hierarchical clusters 313 in relation to FIG. 3.

As part of the first iteration 1003, the software application 106 performs a first set of classifications 902 among the connected component to generate corresponding match scores. As shown in the first iteration 1003, these match scores range from 0.05 to 4.5. According to some embodiments, the software application 106 determines whether a hard conflict exists in response to performing the plurality of classifications. The software application 106 identifies the strongest match, which may be the pair corresponding to the highest match score. In this example, records R1 and R3 form a pair having the highest match score. The software application merges records R1 and R3 to form an initial cluster. Because R1 and R3 form a "Strong-Match" R1 and R3 will form a cluster within an upper tier of the hierarchical clustering, where the upper tier is reserved for records forming a strong match. A strong match may be defined as records having a match score that has a threshold match score of 4 or greater. Shown next to the first iteration is the initial cluster of R1 and R3 being formed. These two records are linked by three lines indicating a strong match in a nomenclature match discussed above with respect to FIG. 4A.

After forming an initial cluster, the software application performs a second iteration 1006. The second iteration 1006 includes performing a second set of classifications. As shown in FIG. 10, the second set of classifications includes the initial cluster (e.g., R1 and R3) as well as the remaining records of the connected component. In this example, R1 and R3 are treated as a single input into the classifier and compared to other inputs as part of a pairwise comparison. A second set of corresponding match scores is generated as a result of the second set of classifications.

Next, the software application 106 identifies the highest match score, which is, in this case, a score of 4. This score relates to comparing a first input 203 (FIG. 2) of {R1 and R3} with a second input 206 (FIG. 2) of {R2}. In addition, the set of classifications yields the presence of a hard conflict with respect to comparing {R1 and R3} and {R6}. The hard conflict may arise from the fact that the date of birth (DoB) for R6 is different or substantially different from the DoB shared by R1 and R3. Additionally or alternatively, the hard conflict may arise from the fact that the generational suffix between R6 ("Sr") is not an exact match to the generational suffix of R3 ("Jr"). The detection of a hard conflict precludes R6 from forming a cluster with at least R1, R2, and R3.

This example also demonstrates how the absence of conflict resolution may lead to undesirable results. For example, R6 and R2 have a high match score of 4. Transitive enclosure without conflict resolution would have let to a cluster of R1, R2, R3, and R6. Based on analyzing the match scores of the second set of comparisons and applying conflict resolution, the software application 106 expands the initial cluster to include R1, R2, and R3 as part of the second iteration 1006. Because R1 and R2 have a high score exceeding the threshold match score of a strong match, records R1, R2, and R3 form at least part of the upper tier in the hierarchical clustering.

The software application 106 then performs a third iteration 1009 based on a third set of classifications that yields corresponding match scores. Like the previous iteration, the combination of input pairs being classified includes the growing initial cluster. This reduces the number of pairwise comparisons. As shown in the third iteration 1009, the highest match score is 3.9 belonging to the pair {R1, R2, R3} and {R4}. This match score corresponds to a "Moderate-Match" based on the applied threshold match scores. Because there are no input pairs yielding a "Strong-Match", the software application 106 concludes the determination of an upper tier where the upper tier is reserved for strong matches. That is, the upper tier of the hierarchical clustering is known by the third iteration 1009. This upper tier is made up of a cluster including records R1, R2, and R3. The remaining records individually form singleton clusters in the upper tier.

In this example, the software application 106 begins building a tier below the upper tier, which is a middle tier. Record R4 is included with records R1, R2, and R3 as part of the middle tier, but not the upper tier. Record R4 has a moderate-match with respect to R1 and R3.

The software application 106 then performs a fourth iteration 1012 based on a fourth set of classifications that yields corresponding match scores. The highest match in the fourth iteration is 2.2, which corresponds to a weak-match label. Because there are no input pairs yielding a moderate-match, the software application 106 concludes the determination of the middle tier.

In addition, because there are no other input combinations that would yield a minimum match score, the process to determine the hierarchical clustering is complete. Here, record R6, the only remaining input, is associated with a hard conflict with respect to the initial cluster. Thus, the application 106 also concludes the determination of the lower tier.

The example of FIG. 10 may be applied to each connected component within one or more database tables 112 (FIG. 1) to generate a hierarchical clustering for each connected component.

FIG. 11 depicts a processed database table 118 in a computing environment 100 of FIG. 1 according to various embodiments of the present disclosure. After hierarchical clustering is complete for one or more connected components, the software application 106 may generate a processed database table 118 in relation to 316 of FIG. 3. According to various embodiments, the processed database table 118 is similar to the pre-processed database table but has been processed to determine hierarchical clusters. The software application 106 determines hierarchical cluster IDs 1104 for each record according to the hierarchical clusters and assigns hierarchical cluster IDs 1104 for each record.

The hierarchical cluster ID 1104 encodes the position of a record within a hierarchical cluster. In this respect, the hierarchical cluster ID reflects where a record falls within a cluster among the tiers of a hierarchical cluster. The software application 106 assigns a respective hierarchical cluster ID to each record within the connected component according to the hierarchical clustering. The hierarchical cluster ID 1104 includes a series of values where each value reflects a respective tier among the plurality of tiers. For example, the ordinal classifier is configured to label pairs according to three degrees of match strength: Weak-Match, Moderate-Match, and Strong-Match. The software application 106 clusters the connected component according to hierarchical tiers corresponding to these ordinal classifications. The hierarchical cluster ID 1104 is a concatenation of values that represent which cluster a particular record belongs to for a given tier.

As shown in FIG. 11, the hierarchical cluster IDs 1104 are encoded in the format of C-t1-t2-t3 to reflect a three tier system. Here, "t1" is a first value indicating which cluster a record belongs to in the lower tier, which is the tier that groups clusters according to the label, weak-match. Next, "t2" is a second value indicating which cluster a record belongs to in the middle tier, which is the tier that groups clusters according to the label, moderate-match. Lastly, "t3" is a third value indicating which cluster a record belongs to in the upper tier, which is the tier that groups clusters according to the label, Strong-Match.

Records R1-5 have a hierarchical cluster ID 1104 with a "t1" value of 1. Sharing the same value indicates that these records all belong to the same cluster within the lower tier. Record R6 has a hierarchical cluster ID 1104 with a "t1" value of 2 and record R7 has a hierarchical cluster ID with an "t1" value of 3. This means that R6 and R7 form separate clusters along the lower tier. The "t2" value and "t3" values further differentiate which clusters a record belongs to with respect to higher tiers. This is discussed in more detail with respect to FIG. 12.

FIG. 12 is an example of hierarchical cluster IDs provided by a client device in a computing environment 100 of FIG. 1 according to various embodiments of the present disclosure. FIG. 12 shows a client device 124 that interfaces with a software application 106 (FIG. 1) over a network 102 (FIG. 1). The computing architecture is embodied as a client-server system where a client device may send requests to a computing system 101 (FIG. 1) and receive responses from the computing system 101. The client device 124 includes a user interface 1203. The user interface 1203 may include a text field, form, or other graphic menu item to receive user inputs from the client. The user interface 1203 is rendered by a mobile application, browser, or other client-side application. The user interface 1203 allows a user to provide inputs to control the manner of processing one or more database tables 112 (FIG. 1) to generate a processed database table 118. The user interface 1203 also allows a user to control, access, modify, edit, or otherwise manipulate a processed database table 118.

The user of a client device 124 uses the client device 124 to identify clusters of records within a processed database table 118 for subsequent processing. For example, a user may wish to email various customers identified in a processed database table. Because individual records may be duplicative, the user may access a cluster of records that refer to the same entity in accordance with a particular confidence level. This may lead to sending fewer emails or reducing the risk of sending multiple emails to the same entity.

Depending on the reason why a user wishes to access records, hierarchical cluster IDs that reflect hierarchical clustering allow a user to reference a cluster according to a desired level of confidence. The software application 106 is configured to receive a hierarchical cluster ID from a client device 124, via a user interface 1203, to allow a selection of a cluster among the hierarchical clustering according to the hierarchical cluster ID. According to various embodiments, the hierarchical cluster ID is viable in length such that the length corresponds to a respective tier. In this case, a user may provide a portion of the hierarchical cluster ID 1104 to refer to lower tier clusters. As the user provides more values in the hierarchical cluster ID, the user may reference upper tier clusters. Thus, the length of the hierarchical cluster ID corresponds to a respective tier. An upper tier (one associated with a higher confidence in the strength of match) may be referenced by a complete hierarchical cluster ID while a lower tier (one associated with a lower confidence in the strength of match) may be referenced by a partial hierarchical cluster ID.

FIG. 12 shows how the variable length hierarchical cluster ID is used to access different clusters among a hierarchical clustering scheme. A first hierarchical cluster ID 1104a represents a partial hierarchical cluster ID 1104. In this example, the partial hierarchical cluster ID 1104 includes a single value, thereby making it shorter in length than a complete hierarchical cluster ID 1104. The use of a single value allows a user to specify a lower confidence tier. For example, the hierarchical cluster ID "c-1" refers to records R1-R5. Records R1-R5 all have hierarchical cluster IDs beginning with "c-1" and may have additional values beyond that. However, the additional values are not relevant if the user is only concerned with a lower confidence tier.

If the user submits a longer hierarchical cluster ID 1104*b* such as "c-1-1," then the use of additional values allows the software application 106 to identify a higher tier that reflects a moderate confidence level. As shown in FIG. 12, this longer hierarchical cluster ID 1104*b* provides a narrower cluster than the first hierarchical cluster ID 1104*a*. Specifically, record R5 forms part of the lower confidence cluster but not a higher confidence cluster.

An even longer hierarchical cluster ID such as a complete hierarchical cluster ID 1104*c*, such as "c-1-1-2", specifies a cluster on the highest tier. In this case, the singleton cluster R4 is referenced by this hierarchical cluster ID. Users may use complete hierarchical cluster IDs when they want the highest confidence in terms of clustering. In other words, they want clusters only if there is a Strong-Match.

Figure 13:
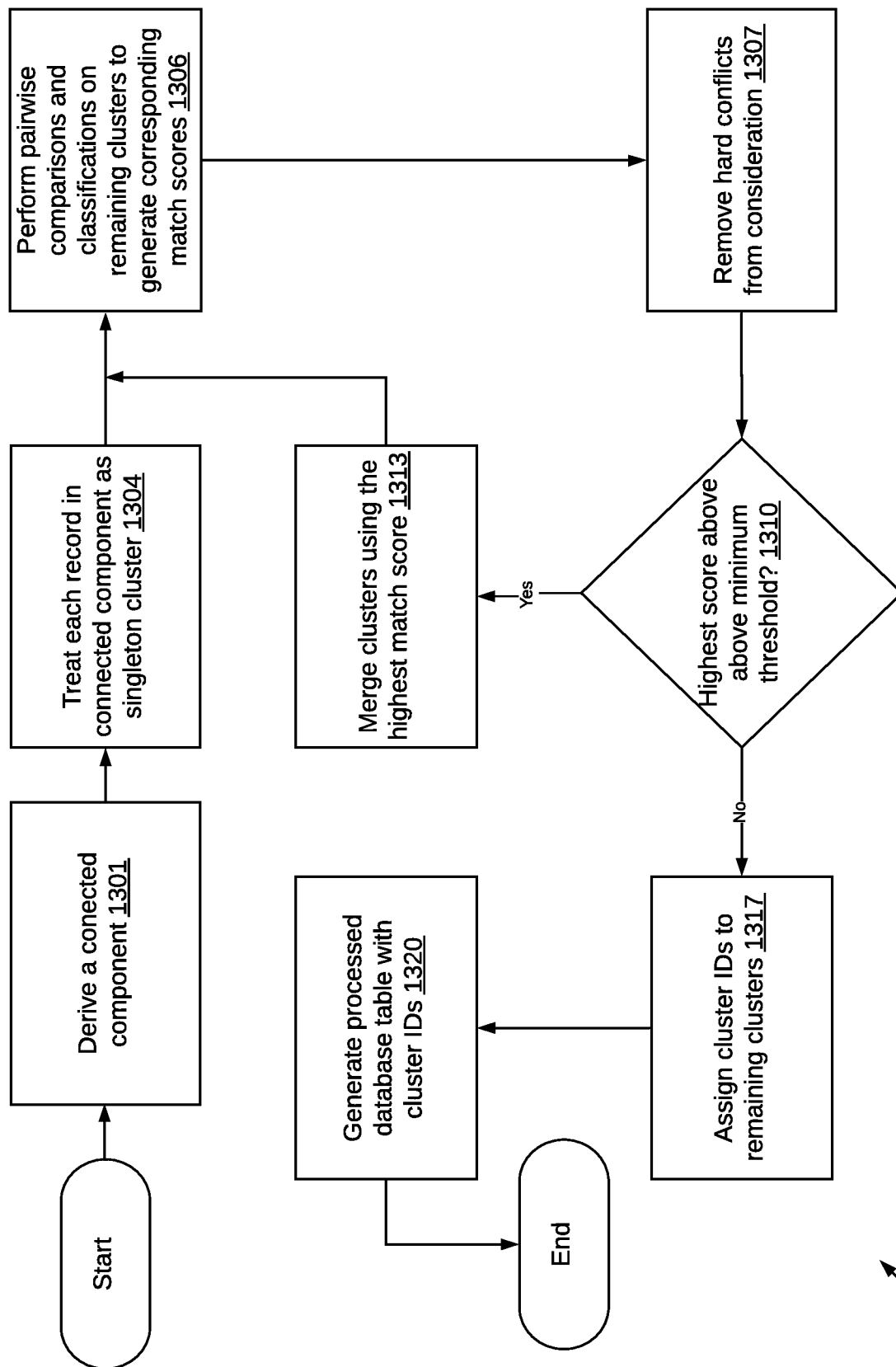
FIG. 13 is a flowchart illustrating an example of the functionality of the software application executed in a computing environment 100 of FIG. 1 performing hierarchical clustering with conflict resolution within a connected component according to various embodiments of the present disclosure.

FIG. 13 is a flowchart illustrating an example of the functionality of the software application 106 executed in a computing environment 100 of FIG. 1 performing hierarchical clustering with conflict resolution according to various embodiments of the present disclosure. It is understood that the flowchart of FIG. 13 provides merely an example of the many different types of functional arrangements that may be employed to implement the operation of the portion of the software application 106 as described herein. As an alternative, the flowchart of FIG. 13 may be viewed as depicting an example of elements of a method implemented in the computing system 101 (FIG. 1) according to one or more embodiments. FIG. 13 provides a more detailed explanation of FIG. 3, particularly with respect to items 310, 313, and 316, At 1301, the software application derives a connected component from one or more database tables 112 (FIG. 1). To derive or otherwise determine a connected component, records may be identified in response to first performing a blocking operation as discussed in FIG. 3, item 307; then performing a classification to identify positive record pairs as discussed in FIG. 3, item 308; and lastly, connecting them together to form a connected component as described in FIG. 3, item 310. The discussion above with respect to FIG. 8 shows how a connected component (made up of records R1-R6) is identified from a plurality of data records from one or more data tables 112. At 1304, the software application 106 initially treats each record as a singleton cluster. In this respect, the pairwise comparisons that are subsequently performed are performed on two inputs, each input being a cluster of one or more records.

At 1306, the software application 106 performs pairwise comparisons and classifications on remaining clusters to generate corresponding match scores. For the first iteration, the pairwise comparisons are performed on the various combinations of record pairs in the connected component. An example of this is presented with respect to FIG. 9, which shows eleven pairwise comparisons based on six records. If a pairwise comparison was previously performed on a particular records pair, then the software application 106 applies the result of that previously performed comparison without performing a redundant calculation. Because pairwise comparisons were performed to create the connected component, the results of these previous pairwise comparisons are stored and reused for future purposes of hierarchical clustering.

At 1307, the software application 106 removes hard conflicts from consideration. For example, the software application 106 looks for two inputs where a hard conflict arises, such as, for example, FIG. 5B. The software application 106 records instances of two inputs having a hard conflict to ensure that subsequent iterations of clustering will avoid clustering together those two inputs. Using ordinal classification and applying a "Hard-Conflict" label allows the software application to detect hard conflicts. Also, the software application 106 may implement one or more hard conflict rules to screen for hard conflicts without classification. According to various embodiments, the operations of 1307 occur simultaneously with the operations of 1306.

At 1310, the software application 106 identifies the highest score above a minimum threshold. Here, the software application is searching for the strongest match among the remaining clusters. The minimum threshold may be the lowest threshold for an acceptable match, such as a weak-match. Thus, the software application 106 continues iterate as long as there is at least a weak-match in the remaining clusters of the connected component.

At 1313, the software application 106 merges clusters using the highest match score. The inputs having the highest match score are merged into a single cluster. The inputs may be singleton clusters or multi-record clusters. This marks the completion of an iteration. Thereafter, the software application 106 proceeds to 1306 where it performs a subsequent iteration. In a subsequent iteration, the remaining clusters include some initial or intermediate cluster that was generated from a previous iteration.

Referring back to 310, when there are no inputs having a sufficiently high match score, the software application 106 assigns hierarchical cluster IDs 1104 (FIG. 11) to remaining clusters at 1317. The software application 106 has completed the generation of a multi-tier clustering. As the software application iterates through performing pairwise comparisons and classifications, it generates hierarchical clustering, where each tier corresponds to a threshold match score. These threshold match scores may correspond to the ordinal labels assigned to various input pairs. As discussed in FIG. 11, the software application generates hierarchical cluster IDs 1104 according to the hierarchical clustering.

At 1320, the software application 106 generates a processed database 118 (FIG. 1) with hierarchical cluster IDs 1104. Users may reference particular clusters within the hierarchical clustering using hierarchical cluster IDs as discussed in FIG. 12.

Figure 14:
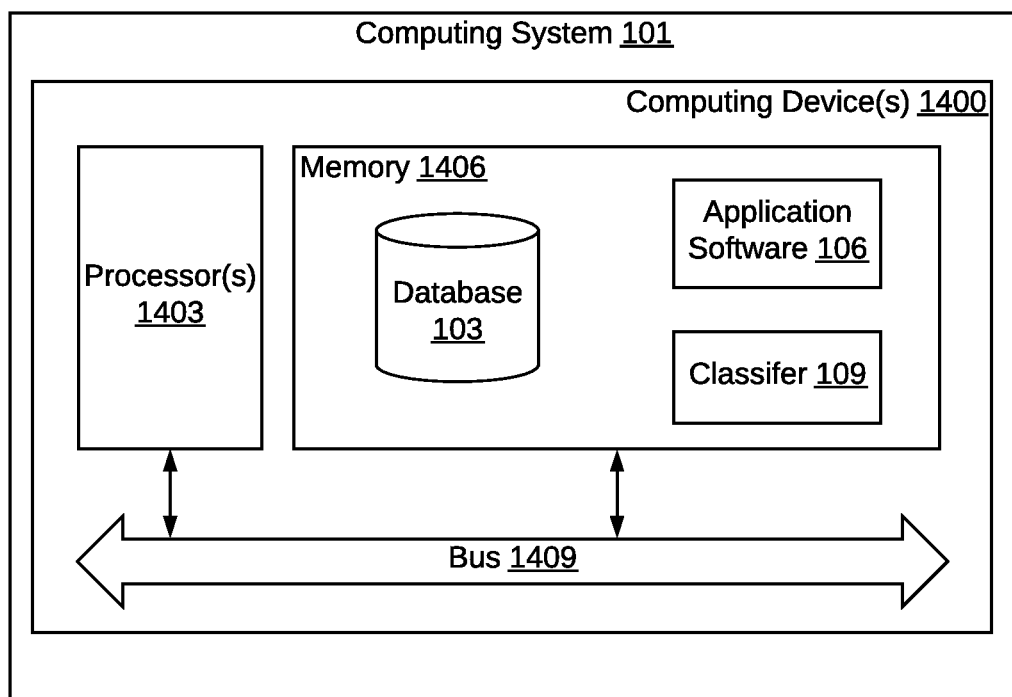
FIG. 14 is a schematic block diagram that provides one example illustration of a computing system 101 of FIG. 1 according to various embodiments of the present disclosure.

FIG. 14 is a schematic block diagram that provides one example illustration of a computing system 101 of FIG. 1 according to various embodiments of the present disclosure. The computing system 101 includes one or more computing devices 1400. Each computing device 1400 includes at least one processor circuit, for example, having a processor 1403 and memory 1406, both of which are coupled to a local interface 1409 or bus. To this end, each computing device 1400 may comprise, for example, at least one server computer or like device. The local interface 1409 may comprise, for example, a data bus with an accompanying address/control bus or other bus structure as can be appreciated.

Stored in the memory 1406 are both data and several components that are executable by the processor 1403. In particular, stored in the memory 1406 and executable by the processor 1403 is the software application 106 and classifier 109. Also stored in the memory 1406 may be a database 103 and other data such as, for example a one or more database tables 112 and a processed database table 118. In addition, an operating system may be stored in the memory 1406 and executable by the processor 1403.

It is understood that there may be other applications that are stored in the memory 1406 and are executable by the processor 1403 as can be appreciated. Where any component discussed herein is implemented in the form of software, any one of a number of programming languages may be employed, such as, for example, C, C++, C#, Objective C, Java®, JavaScript®, Perl, PHP, Visual Basic®, Python®, Ruby, Flash®, or other programming languages.

Several software components are stored in the memory 1406 and are executable by the processor 1403. In this respect, the term "executable" means a program file that is in a form that can ultimately be run by the processor 1403. Examples of executable programs may be, for example, a compiled program that can be translated into machine code in a format that can be loaded into a random access portion of the memory 1406 and run by the processor 1403, source code that may be expressed in proper format such as object code that is capable of being loaded into a random access portion of the memory 1406 and executed by the processor 1403, or source code that may be interpreted by another executable program to generate instructions in a random access portion of the memory 1406 to be executed by the processor 1403, etc. An executable program may be stored in any portion or component of the memory 1406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1406 is defined herein as including both volatile and nonvolatile memory and data storage components. Volatile components are those that do not retain data values upon loss of power. Nonvolatile components are those that retain data upon a loss of power. Thus, the memory 1406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1403 may represent multiple processors 1403 and/or multiple processor cores and the memory 1406 may represent multiple memories 1406 that operate in parallel processing circuits, respectively. In such a case, the local interface 1409 may be an appropriate network that facilitates communication between any two of the multiple processors 1403, between any processor 1403 and any of the memories 1406, or between any two of the memories 1406, etc. The local interface 1409 may comprise additional systems designed to coordinate this communication, including, for example, performing load balancing. The processor 1403 may be of electrical or of some other available construction.

Although the software application 106 described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts discussed above show the functionality and operation of an implementation of the software application 106. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system, such as a processor 1403 in a computer system or other system. The machine code may be converted from the source code, etc. If embodied in hardware, each block may represent a circuit or a number of interconnected circuits to implement the specified logical function(s).

Although the flowcharts show a specific order of execution, it is understood that the order of execution may differ from that which is depicted. For example, the order of execution of two or more boxes may be scrambled relative to the order shown. Also, two or more boxes shown in succession may be executed concurrently or with partial concurrence. Further, in some embodiments, one or more of the boxes may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

The software application 106 may also comprise software or code that can be embodied in any non-transitory computer-readable medium for use by or in connection with an instruction execution system such as, for example, a processor 1403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including software application 106, may be implemented and structured in a variety of ways. For example, one or more applications described may be implemented as modules or components of a single application. Further, one or more applications described herein may be executed in shared or separate computing devices or a combination thereof. For example, the software application described herein may execute in the same computing device 1400, or in multiple computing devices in the same computing system 101. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system comprising:
    a database that stores at least one database table comprising a plurality of records; and
    a memory coupled to a processor, the memory comprising a plurality of instructions that cause the processor to:
        identify a subset of records in the plurality of records according to at least one blocking operation;
        classify the subset of records using an ordinal classifier, the ordinal classifier trained using ordinal training data comprising a set of non-binary ordinal labels, wherein an output of the ordinal classifier comprises a set of match scores and one or more indications of a hard conflict;
        determine to not merge a selected record in the subset of records with a cluster of records in the subset of records when a) a match score associated with the selected record indicates a sufficiently strong match and b) a hard conflict exists between the selected record and the cluster of records; and
        generate a hierarchical clustering for the cluster of records, the hierarchical clustering comprising a plurality of tiers, wherein each tier corresponds to a respective threshold match score, wherein a first tier among the plurality of tiers encompasses a second tier among the plurality of tiers.

2. The system of claim 1, wherein the plurality of instructions that cause the processor to determine whether a hard conflict exists further comprise instructions that cause the processor to apply a hard conflict rule to inputs of a pairwise comparison.

3. The system of claim 1, wherein said at least one blocking operation comprises a blocking rule based on whether the plurality of records contain an exact match with respect to at least one field in the at least one database table.

4. The system of claim 1, wherein the non-binary ordinal labels are selected from a group consisting of a strong match, a weak match, and a hard conflict label.

5. The system of claim 1, wherein the instructions further cause the processor to iteratively classify the subset of records until the match scores include a highest score that falls below a minimum threshold.

6. The system of claim 1, wherein at least one input to the classifier comprises a cluster made up of two or more records among the subset of records.

7. A method comprising:
    classifying a subset of records using an ordinal classifier, the ordinal classifier trained using ordinal training data comprising a set of non-binary ordinal labels, wherein an output of the ordinal classifier comprises a first set of corresponding match scores;
    merging at least two records within the subset of records to generate an initial cluster, the merging performed according to the first set of corresponding match scores;
    performing a second classification using the ordinal classifier, the second classification performed using the initial cluster and a second subset of the records and generating a subsequent set of corresponding match scores, and
    generating a hierarchical clustering for the subset of records, the hierarchical clustering comprising a plurality of tiers, each tier corresponding to a respective ordinal label among the set of ordinal labels, wherein each tier corresponds to a respective threshold match score.

8. The method of claim 7, further comprising determining whether a hard conflict exists between the initial cluster and another record among the subset of records in response to performing the second classifications.

9. The method of claim 8, wherein determining whether a hard conflict exists between the initial cluster and another record among the subset of records comprises applying a hard conflict rule to the initial cluster and another record.

10. The method of claim 8, wherein determining whether a hard conflict exists between the initial cluster and another record among the subset of records comprises evaluating an ordinal label with respect to the initial cluster and another record.

11. The method of claim 7, further comprising:
    identifying the subset of records according to a blocking operation, wherein the blocking operation comprises a blocking rule based on whether the plurality of records of a field are an exact match with respect to at least one field in a database table associated with the plurality of records.

12. The method of claim 7, wherein the set of ordinal labels comprises a strong match, a weak match, and a hard conflict.

13. One or more non-transitory computer-readable, non-volatile storage memory comprising stored instructions that are executable and, responsive to execution by a computing device, the computing device performs operations comprising:
    classifying a subset of records using an ordinal classifier, the ordinal classifier trained using ordinal training data comprising a set of non-binary ordinal labels, wherein an output of the ordinal classifier comprises a set of match scores;
    merging at least two records within the subset of records to generate an initial cluster, the merging performed according to the set of match scores;

performing at a second classification using the ordinal classifier, the second classification performed using the initial cluster and a second subset of the records and generating a subsequent set of corresponding match scores, and generating a hierarchical clustering for the subset of records, the hierarchical clustering comprising a plurality of tiers, wherein each tier corresponds to a respective ordinal label among the set of ordinal labels.

14. The one or more non-transitory computer-readable, non-volatile storage memory of claim 13, wherein the subset of records of at least one database table is identified according to a blocking operation that groups the records of the at least one database table.

15. The one or more non-transitory computer-readable, non-volatile storage memory of claim 14, wherein the blocking operating comprises a blocking rule based on whether a plurality of records in the at least one database table contain an exact match with respect to at least one field in the at least one database table.

16. The one or more non-transitory computer-readable, non-volatile storage memory of claim 13, wherein an existence of a hard conflict between the initial cluster and another record among the subset of records is checked in response to performing the second set of ordinal classifications.

17. The one or more non-transitory computer-readable, non-volatile storage memory of claim 15, wherein an existence of a hard conflict is checked by applying a hard conflict rule to the initial cluster and said another record.

18. The one or more non-transitory computer-readable, non-volatile storage memory of claim 15, wherein an existence of a hard conflict is checked by evaluating an ordinal label with respect to the initial cluster and said another record.

19. The one or more non-transitory computer-readable, non-volatile storage memory of claim 15, wherein the set of ordinal labels comprises a Strong-Match, a Weak-Match, and a Hard-Conflict.

20. A method comprising:

performing a set of pair-wise comparisons on a subset of records stored in at least one database table, the pair-wise comparisons generating a pair of records and a corresponding score for each record in the subset of records;

generating feature signatures corresponding to each of the pair-wise comparisons;

inputting the feature signatures into an ordinal classifier to obtain a first set of match scores, the ordinal classifier configured by training data comprising a set of non-binary ordinal labels;

merging, based on the first set of match scores, at least two records in the subset of records to generate an initial cluster of records, the initial cluster associated with a cluster match score and remaining un-merged records in the subset of records forming a second subset of individual records;

inputting the initial cluster and the un-merged records into the ordinal classifier to obtain a second set of match scores; and generating a hierarchical clustering for the subset of records based on the first set of match scores and second set of match scores, the hierarchical clustering comprising a plurality of tiers corresponding to respective ordinal labels in the set of ordinal labels, wherein the initial cluster is assigned to a corresponding tier based on the first set of match scores and the un-merged records are assigned to a corresponding tier based on the second set of match scores.

* * * * *